United States Patent
Huffman et al.

(10) Patent No.: US 12,468,138 B2
(45) Date of Patent: Nov. 11, 2025

(54) MULTIPHOTON IMAGING METHODS IN A SCATTERING AND/OR ABSORBING MEDIUM, AND ARTICLES

(71) Applicant: 3M INNOVATIVE PROPERTIES COMPANY, St. Paul, MN (US)

(72) Inventors: Alexander J. Huffman, St. Paul, MN (US); Brian J. Gates, Osceola, WI (US); Jeremy K. Larsen, Farmington, MN (US); David A Ender, New Richmond, WI (US); Gareth A. Hughes, St. Paul, MN (US); James D. Hansen, White Bear Lake, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 793 days.

(21) Appl. No.: 17/763,763

(22) PCT Filed: Dec. 2, 2020

(86) PCT No.: PCT/IB2020/061368
§ 371 (c)(1),
(2) Date: Mar. 25, 2022

(87) PCT Pub. No.: WO2021/111321
PCT Pub. Date: Jun. 10, 2021

(65) Prior Publication Data
US 2022/0350127 A1    Nov. 3, 2022

Related U.S. Application Data

(60) Provisional application No. 62/944,062, filed on Dec. 5, 2019.

(51) Int. Cl.
*G02B 21/33*    (2006.01)
*G02B 21/02*    (2006.01)

(52) U.S. Cl.
CPC ............. *G02B 21/33* (2013.01); *G02B 21/02* (2013.01)

(58) Field of Classification Search
CPC ................................ G02B 21/33; G02B 21/02
(Continued)

(56) References Cited

U.S. PATENT DOCUMENTS

| 1,954,755 A | 4/1934 | Hermann |
| 6,730,156 B1 | 5/2004 | Windisch |

(Continued)

FOREIGN PATENT DOCUMENTS

| WO | WO 2015-084737 | 6/2015 |
| WO | WO 2019-175716 | 9/2019 |

(Continued)

OTHER PUBLICATIONS

Ghomi, "New precipitation method for synthesis of nano-fluorapatite", Materials Research Innovations, vol. 17, No. 4, (2013), pp. 257-262.

(Continued)

*Primary Examiner* — Bumsuk Won
*Assistant Examiner* — Mitchell T Oestreich
(74) *Attorney, Agent, or Firm* — Adrian L. Pishko; Sriram Srinivasan

(57) ABSTRACT

The present disclosure provides a multiphoton imaging method. The method includes a) immersing a semi-submersible microscope objective in a liquid medium that is at least one of scattering or absorbing; b) directing laser light through the semi-submersible microscope objective and into the liquid medium in an image-wise manner under conditions such that multiphoton absorption by the multiphoton absorber occurs, and at least partial polymerization of the polymerizable compound occurs resulting in an article; and c) removing uncured polymerizable compound to clean the (Continued)

article. The liquid medium includes a polymerizable compound, a secondary component, and a multiphoton absorber. An article is also provided. The article includes a material defining one or more tortuous or arcuate channels, one or more internal architectural voids, one or more undercuts, one or more perforations, or combinations thereof, at least one of which exhibits a surface roughness of 1.0 micrometer $R_a$ or less.

13 Claims, 10 Drawing Sheets

(58) Field of Classification Search
USPC .......................................................... 359/656
See application file for complete search history.

(56) References Cited

U.S. PATENT DOCUMENTS

| | | | |
|---|---|---|---|
| 7,118,845 | B2 | 10/2006 | Devoe |
| 7,265,161 | B2 | 9/2007 | Leatherdale |
| 9,927,702 | B2 | 3/2018 | Gates |
| 2007/0031791 | A1 | 2/2007 | Cinader, Jr. |
| 2012/0218535 | A1 | 8/2012 | Thiel |
| 2016/0299426 | A1* | 10/2016 | Gates .................... G02B 1/14 |
| 2018/0127317 | A1 | 5/2018 | Mayr |

FOREIGN PATENT DOCUMENTS

| | | |
|---|---|---|
| WO | WO 2019-186070 | 10/2019 |
| WO | WO 2020-157598 | 8/2020 |

OTHER PUBLICATIONS

Kannan, "Synthesis and Mechanical Behavior of Chlorapatite and Chlorapatite/β-TCP Composites", Journal of the European Ceramic Society, 2007, vol. 27, No. 5, pp. 2287-2294.

Montazeri, "Synthesis of fluorapatite-hydroxyapatite nanoparticles and toxicity investigations" International Journal of Nanomedicine, 2011, vol. 6, pp. 197-201.

Obata, "High-aspect 3D two-photon polymerization structuring with widened objective working range (WOW-2PP)", Light: Science and Applications, 2013, vol. 2, 4pages.

International Search report for PCT International Application No. PCT/IB2020/061368 mailed on Apr. 21, 2021, 6 pages.

* cited by examiner

510
Immerse a semi-submersible microscope objective in a liquid medium that is at least one of scattering or absorbing, the liquid medium comprising a polymerizable compound, a secondary component, and a multiphoton absorber

520
Direct laser light through the semi-submersible microscope objective and into the liquid medium in an image-wise manner under conditions such that multiphoton absorption by the multiphoton absorber occurs, and at least partial polymerization of the polymerizable compound occurs resulting in an article

530
Remove uncured polymerizable compound to clean the article

FIG. 5

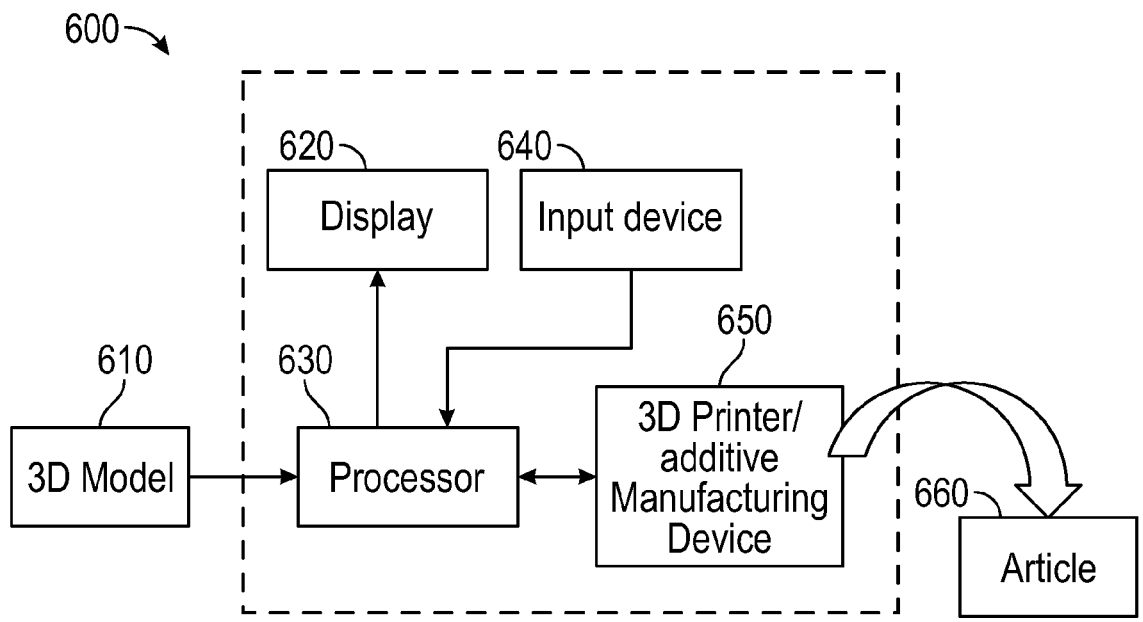

MULTIPHOTON IMAGING METHODS IN A SCATTERING AND/OR ABSORBING MEDIUM, AND ARTICLES

TECHNICAL FIELD

The present disclosure broadly relates to multiphoton imaging methods.

BACKGROUND

In a microscope, the objective (sometimes referred to in the art as an objective lens) is the optical element that gathers light from the object being observed and focuses the light rays to produce a real image. For example, the objective lens of a microscope is the one at the bottom near the sample. At its simplest, it is a very high-powered magnifying glass, with very short focal length. This is brought very close to the specimen being examined so that the light from the specimen comes to a focus inside the microscope tube. The microscope objective itself is typically substantially cylindrical or tubular and contains one or more lenses, typically made of glass, confined within a protective barrel. Microscope objectives generally have an optical inlet and optical outlet, typically centered along opposite ends of its longitudinal axis. The optical inlet and optical outlet are connected by an optical path extending between them through the microscope objective.

Microscope objectives are typically characterized by two parameters: magnification and numerical aperture. The former typically ranges from 4×-100×, while the latter ranges from about 0.1 to 1.4, and focal lengths of about 30 millimeters to about 200 microns, respectively. Similarly, microscope objectives with numerical apertures in the range of about 0.1 to 1.4 typically have respective working distances (i.e., the distance between the microscope objective and the focal point where imaging occurs) of from several millimeters to about 210 microns. Similarly, for high magnification applications, an oil-immersion objective or water-immersion objective generally has to be used. The objective is specially designed to use refractive index matching oil or water to fill the air gap between the front element and the object to allow the numerical aperture to exceed 1, and hence give greater resolution at high magnification. Numerical apertures as high as 1.5 or even higher can be achieved with oil immersion. Microscope objectives with high numerical aperture (NA) and of high quality are typically quite expensive.

Microscope objectives are also used to focus laser light in a process known as multiphoton stereolithography. In that process, laser light (typically in the near infrared) is focused in a photopolymerizable composition (often referred to as a "photoresist"), typically supported on a substrate or in a vat. The photopolymerizable composition contains a multiphoton absorbing compound, and the laser has sufficiently high power that two (or, less typically, more than two) photons are absorbed essentially simultaneously by the multiphoton absorbing compound resulting in subsequent polymerization of the photoresist.

SUMMARY

In a first aspect, a multiphoton imaging method is provided. The method includes a) immersing a semi-submersible microscope objective in a liquid medium that is at least one of scattering or absorbing; b) directing laser light through the semi-submersible microscope objective and into the liquid medium in an image-wise manner under conditions such that multiphoton absorption by the multiphoton absorber occurs, and at least partial polymerization of the polymerizable compound occurs resulting in an article; and c) removing uncured polymerizable compound to clean the article. The liquid medium includes a polymerizable compound, a secondary component, and a multiphoton absorber. The semi-submersible microscope objective includes i) a microscope objective having a protective barrel with an optical inlet and optical outlet; and ii) a protective element affixed to the microscope objective, sealing the optical outlet but not the optical inlet. A transparent portion of the protective element is aligned with the optical outlet.

In a second aspect, an article is provided. The article includes a material defining one or more tortuous or arcuate channels, one or more internal architectural voids, one or more undercuts, one or more perforations, or combinations thereof, at least one of which exhibits a surface roughness of 1.0 micrometer $R_a$ or less.

In a third aspect, another method is provided. The method includes a) retrieving, from a non-transitory machine readable medium, data representing a 3D model of an article; b) executing, by one or more processors, a 3D printing application interfacing with a manufacturing device using the data; and c) generating, by the manufacturing device, a physical object of the article. The article includes a gelled article obtained by at least partial polymerization of a liquid medium that is at least one of scattering or absorbing, the liquid medium including a polymerizable compound, a secondary component, and a multiphoton absorber.

In a fourth aspect, a further method is provided. The method includes a) receiving, by a manufacturing device having one or more processors, a digital object comprising data specifying a plurality of layers of an article; and b) generating, with the manufacturing device by an additive manufacturing process, the article based on the digital object. The article includes a gelled article obtained by at least partial polymerization of a liquid medium that is at least one of scattering or absorbing, the liquid medium including a polymerizable compound, a secondary component, and a multiphoton absorber.

In a fifth aspect, a system is provided. The system includes a) a display that displays a 3D model of an article; and b) one or more processors that, in response to the 3D model selected by a user, cause a 3D printer to create a physical object of an article. The article includes a gelled article obtained by at least partial polymerization of a liquid medium that is at least one of scattering or absorbing, the liquid medium including a polymerizable compound, a secondary component, and a multiphoton absorber.

In a sixth aspect, a non-transitory machine readable medium is provided. The medium includes data representing a three-dimensional model of an article, when accessed by one or more processors interfacing with a 3D printer, causes the 3D printer to create an article. The article includes a gelled article obtained by at least partial polymerization of a liquid medium that is at least one of scattering or absorbing, the liquid medium including a polymerizable compound, a secondary component, and a multiphoton absorber.

In a seventh aspect, an article is provided that is made by the method of the first aspect.

Features and advantages of the present disclosure will be further understood upon consideration of the detailed description as well as the appended claims.

BRIEF DESCRIPTION OF THE DRAWINGS

FIG. 5 is a flowchart of an exemplary process for making an article.

FIG. 6 is a block diagram of a generalized system 600 for additive manufacturing of an article.

Figure 1A:
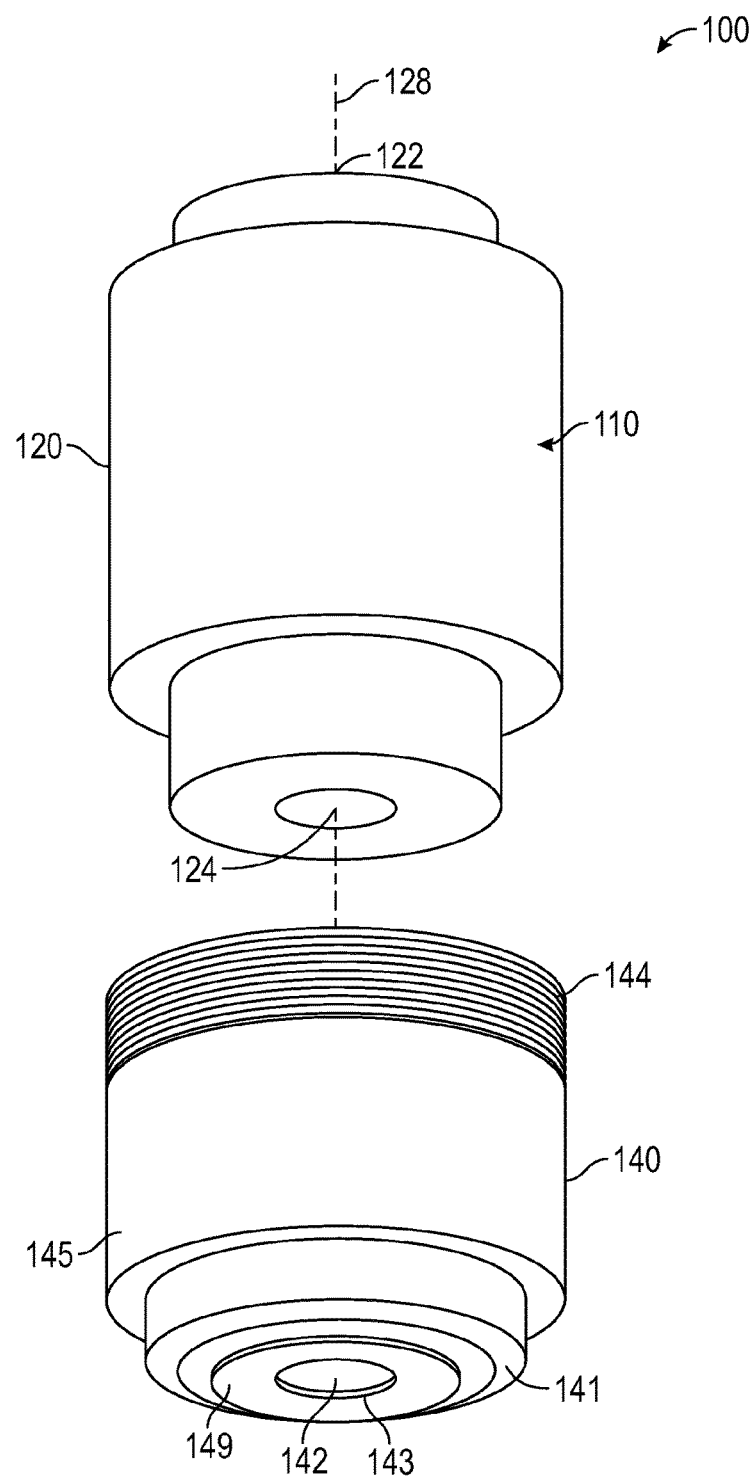
FIG. 1A is a schematic exploded perspective view of exemplary semi-submersible microscope objective 100.
Figure 2A:
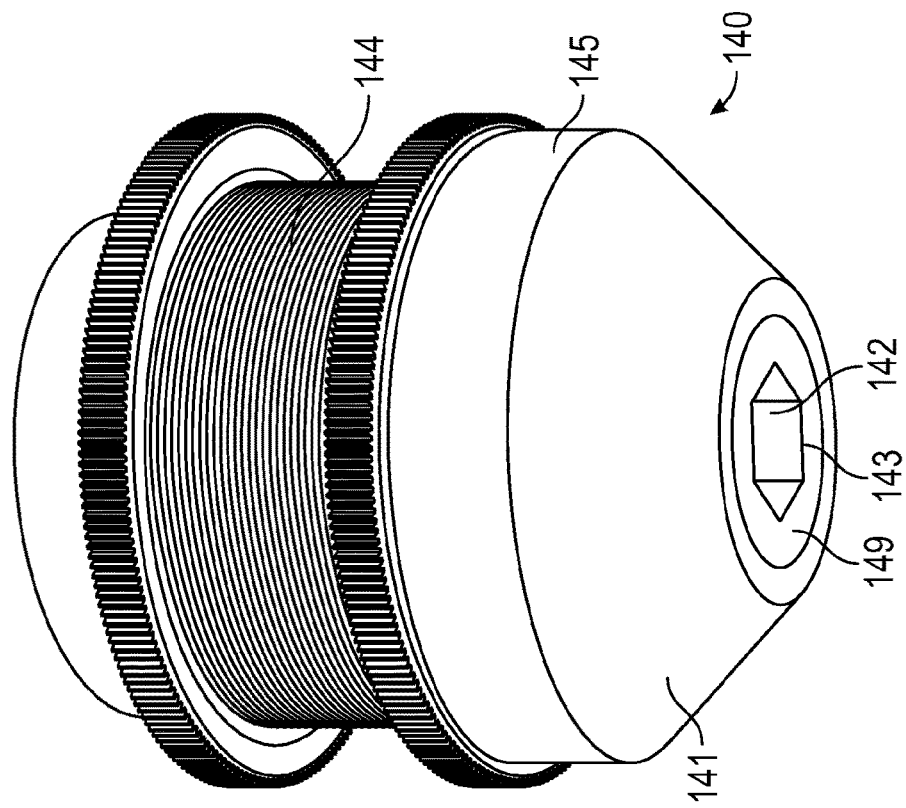
FIG. 2A is a schematic perspective view of an exemplary protective element 140.

Repeated use of reference characters in the specification and drawings is intended to represent the same or analogous features or elements of the disclosure. It should be understood that numerous other modifications and embodiments can be devised by those skilled in the art, which fall within the scope and spirit of the principles of the disclosure. The figures may not be drawn to scale.

DETAILED DESCRIPTION

Glossary:

As used herein:

"absorbing" refers to chemically or physically taking in electromagnetic radiation or thermal energy;

"ceramic" and "ceramic article" include amorphous material, glass, crystalline ceramic, glass-ceramic, and combinations thereof, and refers to non-metallic materials produced by application of heat. Ceramics are usually classified as inorganic materials. The term "amorphous material" refers to material that lacks long range crystal structure as determined by X-ray diffraction and/or has an exothermic peak corresponding to the crystallization of the amorphous material as determined by DTA (differential thermal analysis). The term "glass" refers to amorphous material exhibiting a glass transition temperature. The term "glass-ceramic" refers to ceramics comprising crystals formed by heat-treating amorphous material. The term "crystalline ceramic" refers to a ceramic material exhibiting a discernible X-ray powder diffraction pattern. "Crystalline" means a solid composed of atoms arranged in a pattern periodic in three dimensions (i.e., has long-range crystal structure, which may be determined by techniques such as X-ray diffraction). A "crystallite" means a crystalline domain of a solid having a defined crystal structure. A crystallite can only have one crystal phase. "Semicrystalline" means a material that comprises both an amorphous region and a crystalline region;

"ceramic particle" encompasses particles of amorphous material, glass, crystalline ceramic, glass-ceramic, and combinations thereof, and refers to non-metallic materials produced by application of heat or made by a chemical synthesis process. Ceramic particles are usually classified as inorganic materials. The term "amorphous material" with respect to ceramic particles refers to a material derived from a melt and/or a vapor phase as well as a material made from chemical synthesis, wherein the material lacks long range crystal structure as determined by X-ray diffraction and/or has an exothermic peak corresponding to the crystallization of the amorphous material as determined by DTA (differential thermal analysis). For instance, amorphous silica nanoparticles may be generated by condensation of silanes to form the nanoparticles;

"cleaning an article" means substantially removing (e.g., dissolving) soluble material from an article in a solvent while substantially not removing insoluble material from the article;

"curing" means the hardening or partial hardening of a hardenable composition by any mechanism, e.g., by heat, light, radiation, e-beam, microwave, chemical reaction, or combinations thereof;

"density" means the ratio of mass to volume of an object. The unit of density is typically grams per cubic centimeter ($g/cm^3$). The density of an object can be calculated e.g., by determining its volume (e.g., by calculation or applying the Archimedes principle or method) and measuring its mass. The volume of a sample can be determined based on the overall outer dimensions of the sample. The density of the sample can be calculated from the measured sample volume and the sample mass. The total volume of a material sample can be calculated from the mass of the sample and the density of the used material. The total volume of cells in the sample is assumed to be the remainder of the sample volume (100% minus the total volume of material);

"dental article" means any article which can or is to be used in the dental or orthodontic field, especially for producing of or as dental restoration, a tooth model and parts thereof. Examples of dental articles include crowns (including monolithic crowns), bridges, inlays, onlays, veneers, facings, copings, crown and bridged framework, implants, abutments, orthodontic appliances (e.g. brackets, buccal tubes, cleats and buttons) and parts thereof. The surface of a tooth is considered not to be a dental article;

"fiber" refers to a material that has an aspect ratio (i.e., length-to-diameter ratio) that is 5:1 (mean length:mean diameter) or greater. Typically, the aspect ratio is 1,000:1 or less. It is appreciated that the cross-sectional shape of the fiber may not be exactly circular. As such, the cross-sectional area of the fiber can be used to arrive at a "diameter" value to be used for the aspect ratio.

"gel", "gelled article", and "gelled body" are used interchangeably and mean a three-dimensional gel resulting from the curing reaction of polymerizable components contained in a polymerizable composition;

"hardenable" refers to a material that can be cured or solidified, e.g., by heating to remove solvent, heating to cause polymerization, chemical crosslinking, or radiation-induced polymerization or crosslinking (such as multiphoton curing);

"heat treating", "calcining", "binder burn out", or "debindering" refers to a process of heating solid material to drive off at least 90 percent by weight of volatile chemically bound components (e.g., organic components) (versus, for example, drying, in which physically bonded water is driven off by heating). Heat treating is done at a temperature below a temperature needed to conduct a sintering step;

"index-matched" refers to two materials having approximately the same refractive index (e.g., within 0.05 of the same refractive index. It is noted that it is possible to have a refractive index mismatch between two materials that is less than 0.05 for which it would still be useful to use methods according to the present disclosure;

"integral" means being made at the same time or being incapable of being separated without damaging one or more of the (integral) parts, e.g., "unitary";

"internal architectural void" refers to refers to a void fully encompassed within an article (e.g., does not extend to any exterior surface of the article) and that has a designed shape, such as one programmed into an additive manufacturing device employed to selectively cure the photopolymerizable composition to create a shape of the article. An internal architectural void is in contrast to an internal pore formed during manufacture of the article;

"light" means electromagnetic radiation having a wavelength in a range of from about 300 to about 1500 nm;

"liquid" refers to a state of matter that is liquid at one atmosphere of pressure and at least one temperature in the range of from 20-25° C., inclusive, (as opposed to being in a gaseous or solid state of matter), and encompasses solutions, dispersions of solids in a liquid (e.g., sols and slurries), emulsions, and compositions containing more than one discontinuous liquid phase;

"mass inertial force" as referred to herein may be specified as force per unit mass and therefore may be specified in the unit $m/s^2$. Further, the mass inertial force can be expressed by the G-force which is a factor of the acceleration of gravity. For the purposes of the present specification, the acceleration of gravity is 9.81 $m/s^2$. Consequently, for example, a mass inertial force of 9.81 $m/s^2$ can be expressed as 1 G;

"medium" refers to a composition containing at least one component;

"multiphoton absorption" means the simultaneous absorption of two or more photons of light to reach a photoreactive, electronic excited state that is energetically inaccessible by the absorption of a single photon of the same energy;

"multiphoton absorber" means a species capable of undergoing multiphoton absorption of light;

"numeric aperture" means the product of the index of refraction of the object medium multiplied by the sine of the slope angle of the outermost ray from an axial point on the object;

"optical entrance" refers to the end of a microscope objective where the light beam has parallel light rays;

"optical outlet" refers to the end of a microscope objective where the light beam converges;

"particle" refers to a substance being a solid having a shape which can be geometrically determined. The shape can be regular or irregular. Particles can typically be analyzed with respect to e.g., particle size and particle size distribution. A particle can comprise one or more crystallites. Thus, a particle can comprise one or more crystal phases;

"photochemically effective amount" means an amount sufficient to enable the photoreactive species to undergo at least partial reaction under the selected exposure conditions (as evidenced, e.g., by a change in density, viscosity, color, pH, refractive index, or other physical or chemical property);

"polymerizable" means a hardenable component that can be cured to provide an article, including hardening comprising curing following multiphoton absorption;

"porous material" refers to a material comprising a partial volume that is formed by voids, pores, or cells in the technical field of ceramics. Accordingly, an "open-celled" structure of a material sometimes is referred to as "open-porous" structure, and a "closed-celled" material structure sometimes is referred to as a "closed-porous" structure. It may also be found that instead of the term "cell" sometimes "pore" is used in this technical field. The material structure categories "open-celled" and "closed-celled" can be determined for different porosities measured on different material samples (e.g., using a mercury "Poremaster 60-GT" from Quantachrome Inc., USA) according to DIN 66133. A material having an open-celled or open-porous structure can be passed through by e.g., gases;

"scattering" refers to the process in which electromagnetic radiation or particles are deflected or diffused;

"secondary component" refers to a solid or a liquid that has a different refractive index than a polymerizable compound in a medium or that absorbs electromagnetic radiation;

"simultaneous" means two events that occur within the period of $10^{-14}$ seconds or less;

"sintering" and "firing" are used interchangeably. A porous (e.g., pre-sintered) ceramic article shrinks during a sintering step, that is, if an adequate temperature is applied. The sintering temperature to be applied depends on the ceramic material chosen. Sintering typically includes the densification of a porous material to a less porous material (or a material having less cells) having a higher density, in some cases sintering may also include changes of the material phase composition (for example, a partial conversion of an amorphous phase toward a crystalline phase);

"slurry" refers to a continuous liquid phase containing discrete particles having sizes in a range from greater than 100 nanometer (nm) to 50 micrometers or from greater than 100 nm to 10 micrometers. A slurry may optionally further contain discrete particles having sizes in a range from 1 nm to 100 nm;

"sol" refers to a continuous liquid phase containing discrete particles having sizes in a range from 1 nm to 100 nm;

"solvent" refers to a nonreactive liquid component of a composition that dissolves at least one solid component, or dilutes at least one liquid component, of the composition (in the case of water, adventitious amounts of water are not included by the term "solvent");

"solid" refers to a state of matter that is solid at one atmosphere of pressure and at least one temperature in the range of from 20-25° C., inclusive, (as opposed to being in a gaseous or liquid state of matter);

"surface roughness" refers to the smoothness of a material surface and is quantified as "$R_a$", which refers to the average surface roughness and is defined as the integral of the absolute value of the distance from the mean elevation. The mean elevation is the arithmetic average of the height profile of the surface. The function z(x) refers to the difference between the height and the mean elevation at a position x measured over an evaluation length l:

$$R_a = \frac{1}{l}\int_0^l |z(x)|dx$$

The term "$R_q$" represents the root mean square value of the ordinate values z(x) within the sampling length l $$R_q = \sqrt{\frac{1}{l}\int_0^l z^2(x)dx}$$

The term "$R_{sk}$" refers to the quotient of the mean cube value of the ordinate values z(x) and the cube of $R_q$ within the sampling length l $$R_{sk} = \frac{1}{R_q^3}\left[\frac{1}{l}\int_0^l z^3(x)dx\right]$$

The elevation can be measured using an optical profilometer (e.g., a Wyko NT3300 optical profilometer from Veeco Instruments Inc., Plainview, New Jersey);

"theoretical density" refers to the maximum possible density that would be obtained in a sintered article if all pores were removed. The percent of the theoretical density for a sintered article can be determined, for example, from electron micrographs of a cross-section of the sintered article. The percent of the area of the sintered article in the electron micrograph that is attributable to pores can be calculated. Stated differently, the percent of the theoretical density can be calculated by subtracting the percent voids from 100 percent. That is, if 1 percent of the area of the electron micrograph of the sintered article is attributable to pores, the sintered article is considered to have a density equal to 99 percent of the theoretical density. The density can also be determined by the Archimedes method;

"transparent" refers to refers to a material that has at least 50% transmittance, 70% transmittance, or optionally greater than 90% transmittance over a particular range of wavelengths and has a thickness of 10 millimeters or less; and "voxel" refers to a volumetric pixel, which is the smallest volume element of reacted polymerizable material that is generated by a multiphoton induced reaction.

Also herein, all numbers are assumed to be modified by the term "about" and preferably by the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used.

As used herein as a modifier to a property or attribute, the term "generally", unless otherwise specifically defined, means that the property or attribute would be readily recognizable by a person of ordinary skill but without requiring absolute precision or a perfect match (e.g., within +/−20% for quantifiable properties). The term "substantially", unless otherwise specifically defined, means to a high degree of approximation (e.g., within +/−10% for quantifiable properties) but again without requiring absolute precision or a perfect match. Terms such as same, equal, uniform, constant, strictly, and the like, are understood to be within the usual tolerances or measuring error applicable to the particular circumstance rather than requiring absolute precision or a perfect match.

In general, liquid photoresists (e.g., photopolymerizable compositions) comprise a multiphoton absorbing compound (multiphoton absorber) in combination with at least one polymerizable compound. In multiphoton stereolithographic processes, laser light is directed through the microscope objective (or semi-submersible microscope objective in the case of the present disclosure) and into a liquid photoresist in an image-wise manner under conditions such that multiphoton absorption by the multiphoton absorber, and at least partial polymerization of the polymerizable compound occurs resulting in an exposed photoresist. Removal of uncured photopolymerizable composition, typically with solvent, air, or movement, then reveals a fabricated structure. In some embodiments, removal of photopolymerizable composition comprises moving the at least partially polymerized structure and thereby generating a mass inertial force in uncured photopolymerizable composition disposed on the structure, thereby forming a coating layer of uncured photopolymerizable composition on the structure, wherein the mass inertial force is generated using a centrifuge, a shaker, or a mixer that spins along one or more axes. Suitable ways of generating a mass inertial force are described, for instance, in co-owned application Ser. No. 11/773,498, incorporated herein by reference in its entirety. For instance, the source of the mass inertial force may be generated using a centrifuge, a shaker, or a mixer that spins along one or more axes. In some embodiments, the moving of the object is a rotation or spinning of the object. Accordingly, the mass inertial force may be generated by a centrifugal force. One suitable mixer that spins along more than one axis is a dual asymmetric centrifugal mixer, such as the DAC 400 FVZ available from Flacktek (Landrum, SC). A dual asymmetric centrifugal mixer provides simultaneous dual axis spinning that automatically reorients the structure during spinning, which tends to pull uncured composition out of concave features of the structure in a short period of time (e.g., 20, 15, or 10 seconds or less). Any other conventional method for cleaning the structure and removing uncured material at the structure surface may also be utilized.

Details concerning materials and methods suitable for multiphoton stereolithography using liquid photoresists are described in, for example, U.S. Pat. Appl. Publ. No. 2012/0218535 (Thiel et al.). Typically, liquid photoresists suitable for conventional one-photon stereolithography (an additive manufacturing process which employs a vat of liquid ultraviolet curable photopolymer resin and an ultraviolet laser to build structures by stepwise formation of layers, one on top of another) can be adapted for use as liquid photoresists for multiphoton imaging by replacing the initiator/sensitizer component(s) with ones suitable for multiphoton (e.g., two-photon) imaging. General information concerning materials and methods for practicing multiphoton stereolithography can be found, for example, in U.S. Pat. No. 7,118,845 (DeVoe et al.).

Typical multiphoton imaging involves curing a photopolymerizable composition at the focal point of a beam passing through an objective and moving at least one of the focal point or the photopolymerizable composition in the vat relative to one other in three-dimensional space to form structures in a rastering manner. Numerous microscope objectives having a variety of magnifications and numerical apertures (NA) are available. Higher NA objectives concentrate the beam into a smaller focal point and translate beam motion into smaller movements at the build surface, typically leading to better resolution in each of the x, y & z axes than lower NA objectives. The high NA objectives, however, have a relatively small field of view and are limited to either forming small parts, or tiling together multiple adjacent structures to create one, larger piece that exhibits stitch lines from where the components were attached together. Using low magnification objectives enables formation of larger structures in a single field without moving the build stage, resulting in faster fabrication without any stitch lines. The working distance, meaning the length from the physical lens to the point of cure, is typically longer for lower magnification optical objectives. When submerged in a curable material, the beam travels the full working distance through the material. Typical multiphoton polymerizable materials are transparent to an 800 nanometer beam, so this travel distance has little to no effect of the curing focal point. In contrast, materials that are loaded with particles, for instance, can scatter the incoming beam and diffuse enough of the beam intensity as it travels through the material that at the focal point, there is not enough remaining energy to polymerize the material. This represents a problem for a medium loaded with scattering and/or absorbing components.

In a first aspect, a multiphoton imaging method is provided. The multiphoton imaging method comprises:

a) immersing a semi-submersible microscope objective in a liquid medium that is at least one of scattering or absorbing, the liquid medium comprising a polymerizable compound, a secondary component, and a multiphoton absorber, wherein the semi-submersible microscope objective comprises:
   i) a microscope objective having a protective barrel with an optical inlet and optical outlet; and
   ii) a protective element affixed to the microscope objective, sealing the optical outlet but not the optical inlet, wherein a transparent portion of the protective element is aligned with the optical outlet;
b) directing laser light through the semi-submersible microscope objective and into the liquid medium in an image-wise manner under conditions such that multiphoton absorption by the multiphoton absorber occurs, and at least partial polymerization of the polymerizable compound occurs resulting in an article; and
c) removing uncured polymerizable compound to clean the article.

Removing uncured polymerizable compound optionally includes rinsing the article, (e.g., an ultrasonic, or bubbling, or spray rinse) in a solvent, which would dissolve a portion of the liquid medium containing uncured polymerizable compound but not the cured, solid state article (e.g., gelled article).

In a second aspect, an article is provided. The article comprises a material defining one or more tortuous or arcuate channels, one or more architectural voids, one or more undercuts, one or more perforations, or combinations thereof, at least one of which exhibits a surface roughness of 1.0 micrometer $R_a$ or less.

The below disclosure relates to both the first and second aspects.

Advantageously, methods according to at least certain embodiments of the present disclosure unexpectedly enable the direct fabrication of high-resolution final parts with little need for surface finishing. Moreover, the parts may exhibit nearly identical mechanical properties to those made using conventional 3D printing (e.g., stereolithography). It has been discovered that by using a protective barrel, the distance the beam must travel through the liquid medium can be reduced at will, even for optical objectives with large fields of view and longer working distances. The working distance of any low magnification objective can optionally be filled with a transparent, index-matching fluid (or contain a gas such as ambient air) to reduce the beam path length through a liquid medium that is a scattering medium, an absorbing medium, or both. This allows the beam to pass through only a small layer of scattering and/or absorbing medium, losing a minimal amount of power in the process with little to no effect on the field or curing spot size. Further, using a larger field eliminates the need to tile together multiple adjacent structures and form stitch lines that can be a stress and crack concentration point during post-processing and in end use.

In some embodiments, a field of view of the microscope objective is 100 micrometers or greater, 200 micrometers or greater, 300 micrometers or greater, 400 micrometers or greater, 500 micrometers or greater, 600 micrometers or greater, 700 micrometers or greater, 800 micrometers or greater, 900 micrometers or greater; and the field of view of the microscope objective is 10 millimeters (mm) or less, 8 mm or less, 6 mm or less, 4 mm or less, 3 mm or less, 2.5 mm or less, 2 mm or less, 1.5 mm or less, or 1 mm or less. Stated another way, the field of view of the microscope objective may be 100 micrometers to 10 mm, 500 micrometers to 10 mm, 1 micrometer to 10 mm, or 1 micrometer to 6 mm.

The semi-submersible microscope objective can be made by modifying a conventional microscope objective. Microscope objectives (also known as microscope objective lenses) are well-known in the art and are commercially available from numerous sources including, for example: Carl Zeiss Microscopy, LLC, Thornwood, New York (e.g., microscope objectives marketed as OBJECTIVE ALPHA PLAN-APOCHROMAT 100×/1.46 OIL DIC M27, OBJECTIVE ANTIFLEX EC PLAN-NEOFLUAR 63×/1.25 OIL PH3 M27, OBJECTIVE ALPHA PLAN-APOCHROMAT 100×/1.57 OIL-HI DIC CORR M27, ZEISS 4033/1.0 OIL IRIS MICROSCOPE OBJECTIVE (NA=1.0) and OBJECTIVE ALPHA PLAN-APOCHROMAT 100×/1.46 OIL IRIS M27); Nikon Instruments Inc., Melville, New York (e.g., microscope objectives marketed as PLAN 100×W (NA=1.1), CFI S FLUOR 40× OIL (NA=1.30), and CFI S FLUOR 100× OIL (NA=0.5-1.3)); and Olympus Corp., Tokyo, Japan (e.g., microscope objectives marketed as M PLAN APOCHROMAT MPLAPON100×O (NA=1.4)).

Advantageously, the present disclosure is especially useful for expensive microscope objectives such as, for example, those designed for immersion in oil or water and/or having a numerical aperture (NA) of 1.4 or less, 1.3 or less, 1.2 or less, 1.1 or less, 1 or less, 0.9 or less, 0.8 or less, 0.7 or less, 0.6 or less, 0.5 or less, 0.4 or less, or 0.3 or less. In some embodiments, the microscope objective has a numerical aperture in a range of from 0.1 to 1.4. Objective numerical aperture can be dramatically increased by designing the objective to be used with an immersion medium, such as oil, glycerin, or water.

Referring to FIG. 1A, a semi-submersible microscope objective 100 comprises a microscope objective 110 and a protective element 140. The microscope objective 110 comprises a protective barrel 120, an optical inlet 122, and an optical outlet 124 from which laser light emerges from the microscope objective during multiphoton stereolithography. The optical inlet 122 and the optical outlet 124 are aligned with a centrally disposed longitudinal axis 128. The protective element 140 is affixed to the microscope objective 110 such that it seals the optical outlet 124 but not the optical inlet 122. The protective element 140 includes a transparent portion 142, which is aligned with the optical outlet 124.

Figure 1B:
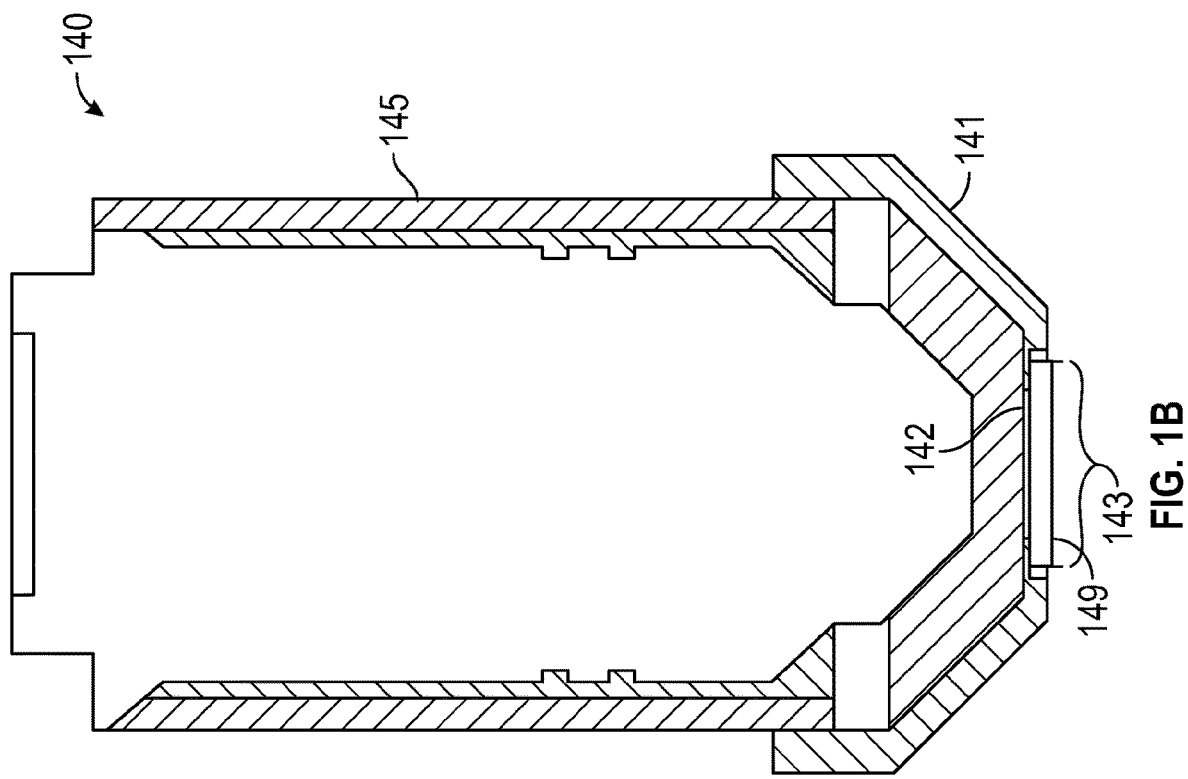
FIG. 1B is a schematic cross-sectional view of an exemplary protective element 140.

In the embodiment shown, the protective element 140 comprises a cap 141 having a central opening 143 and a sleeve portion 145 extending from the cap 141. The sleeve portion 145 is adapted to mechanically engage the protective barrel 120 of the microscope objective 110. The transparent portion 142 comprises a glass substrate 149 secured to the cap 141 (e.g., by adhesive or mechanically), which forms a seal protecting the optical outlet from contact with the liquid medium during use. The glass substrate 149 covers the central opening 143 and is adhered to the cap 141. The cap and the sleeve portions are shown as being parts of a monolithic protective element; however, they may comprise separate pieces that are assembled to form part, or all, of the protective element. A cross-sectional schematic drawing of the protective element 140 is shown in FIG. 1B. In select embodiments, the transparent portion of the protective element comprises a cylindrical lens.

The protective element may be constructed of any suitable material(s) including, for example: plastic (e.g., polycarbonate, polyimide, polyetherimide (PEI), polyether ether ketone (PEEK), polyester, polyamide, polyurethane, polyolefin (e.g., low molecular weight polyethylene, high density polyethylene (HDPE), ultrahigh molecular weight polyethylene (UHMWPE), or polypropylene), or polyacetal (e.g., polyoxymethylene); metal; glass; sapphire; quartz; or a combination thereof.

The transparent portion 142 may comprise or consist of any transparent material including, for example, glass, quartz, sapphire, plastic, diamond, silicon mononitride, alumina, or a combination thereof. While depicted as forming a raised cover over the central opening, in may also be disposed flush with the cap or even be recessed within it or disposed on its interior.

Figure 2C:
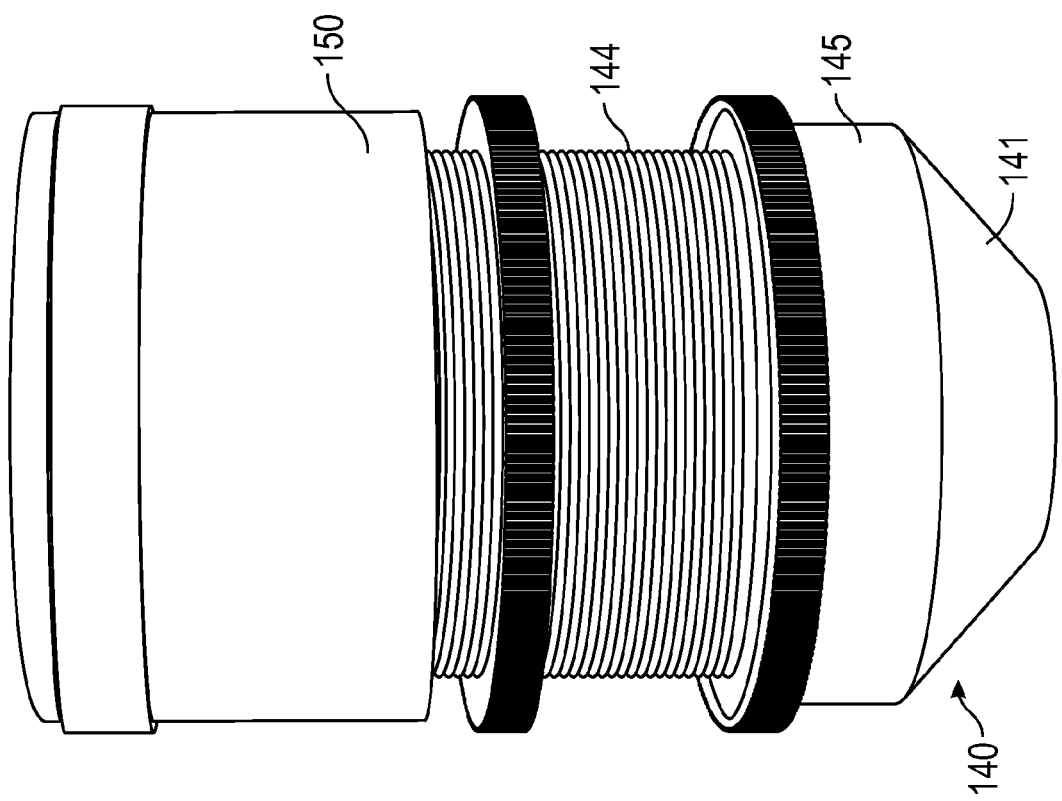
FIG. 2C is a schematic side view of an exemplary protective element 140 affixed to a microscope objective via an exemplary connector 150.
Figure 2B:
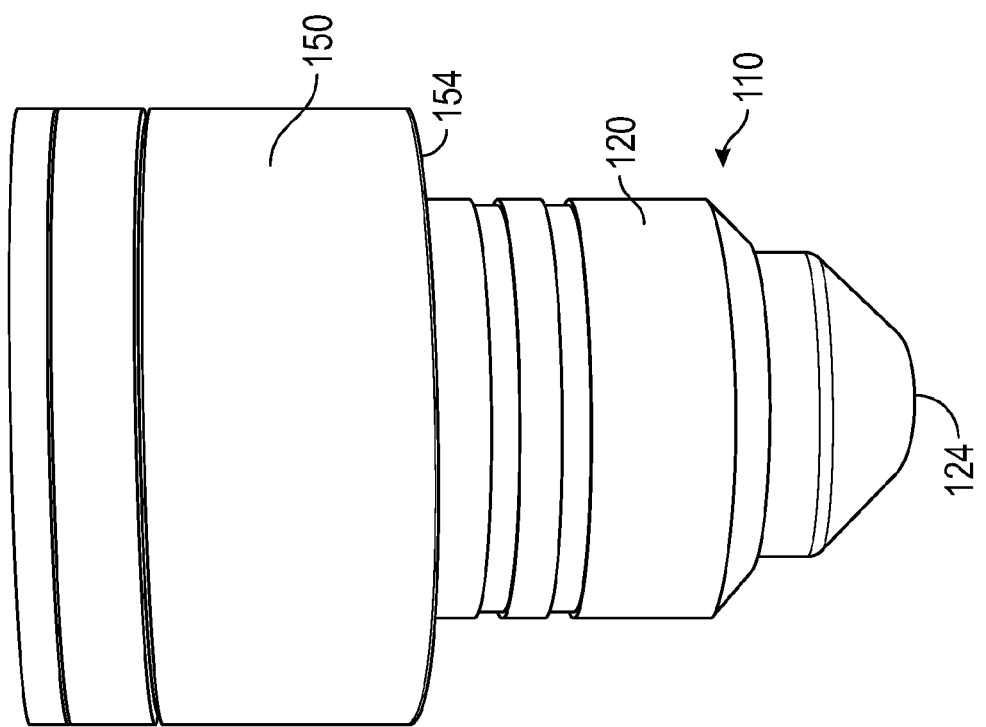
FIG. 2B is a schematic side view of an exemplary connector 150 affixed to a microscope objective 110.

The protective element is typically affixed to the microscope objective in a removable manner. That is, it can be separated from the microscope objective substantially without damaging the microscope objective. Suitable mechanical means for affixing the protective element to the microscope objective include, for example, threaded fasteners (as shown in FIGS. 1-2), clamps, press fit, repositionable adhesive, and other interlocking mechanical fasteners (e.g., hook and loop fasteners or capped stem fasteners). In the embodiment of FIG. 1A, the protective element 140 mechanically engages the microscope objective 110, and is reversibly affixed to the microscope objective 110 using an external thread 144 in conjunction with an internal thread (see FIGS. 2A-2B), which attaches the sleeve portion 145 onto the protective barrel 120. The external threads 144 are not shown in the schematic of FIG. 1B. Accordingly, the protective element 140 is separable from microscope objective 110 without damaging microscope objective 110. A connector 150 can be seen in FIG. 2B, which fastens the external thread 144 to the microscope objective 110 via an internal thread 154 (not visible). Having such a threaded fastener allows for adjustment of a distance between the optical outlet 124 of the microscope objective 110 and the transparent portion 142 of the protective element 140. FIG. 2C provides a schematic side view of a protective element 140 attached to the microscope objective by being threaded to the connector 150. Typically, the protective element is separable from the microscope objective with damaging the microscope objective. It is also contemplated, however, that the protective element could be formed to be integral with the microscope objective instead of being a separate element.

Advantageously, reflections from the inside surface of the glass substrate are decreased when air is replaced by an index-matched fluid. An index-matched fluid 147 (e.g., oil) can be disposed between the optical outlet 124 and the transparent portion 142 of the protective element 140, for instance disposed between the optical outlet 124 and the glass substrate 149, thereby eliminating reflections at the inside surface of the glass substrate 149. As an alternative to an index-matching fluid, a fluid that does not quite match the refractive index of the liquid medium (e.g., has a refractive index closer to that of the liquid medium than air does but is not within 0.05 of the liquid medium) can be used to decrease reflections at the inside surface of the glass substrate.

Figure 3A:
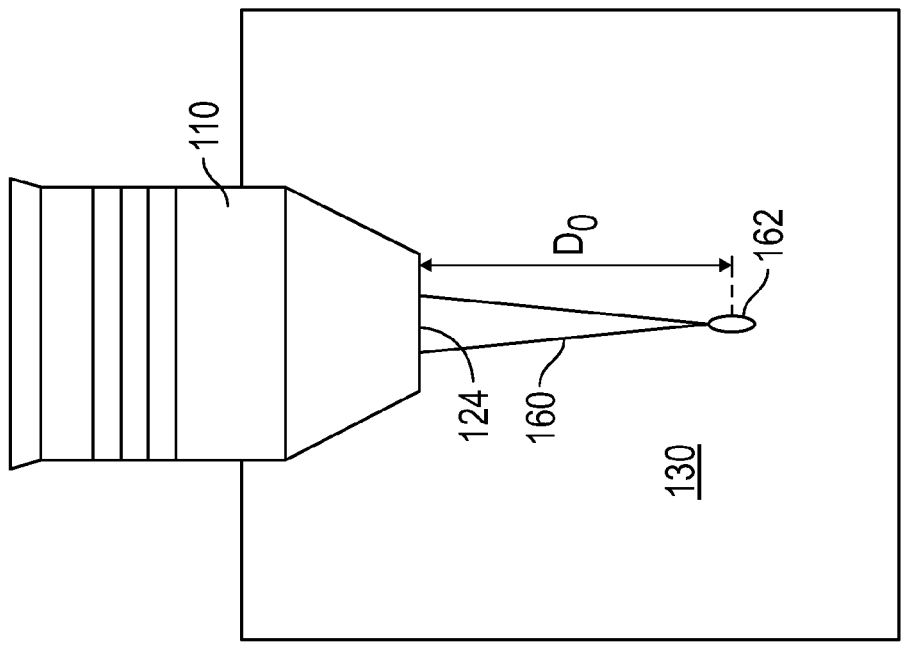
FIG. 3A is schematic side view of a portion of a typical multiphoton curing arrangement in a typical liquid medium.
Figure 2D:
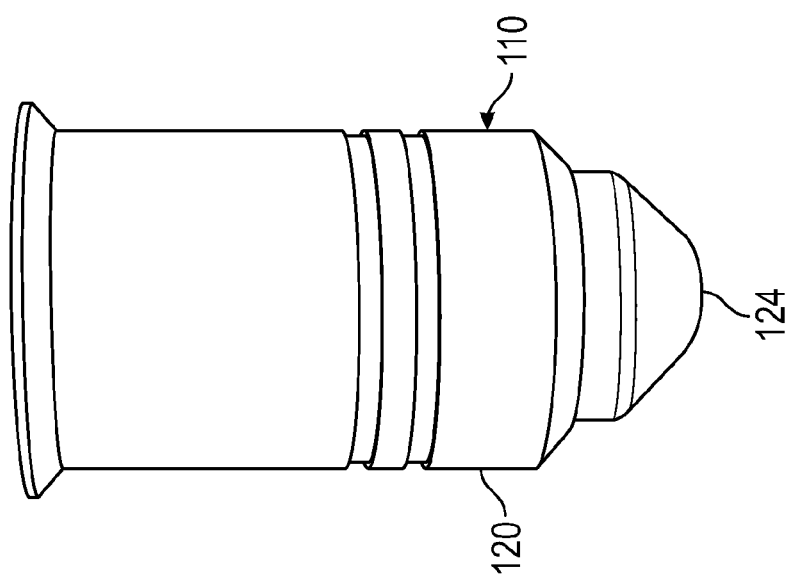
FIG. 2D is a schematic side view of a microscope objective 110.
Figure 4:
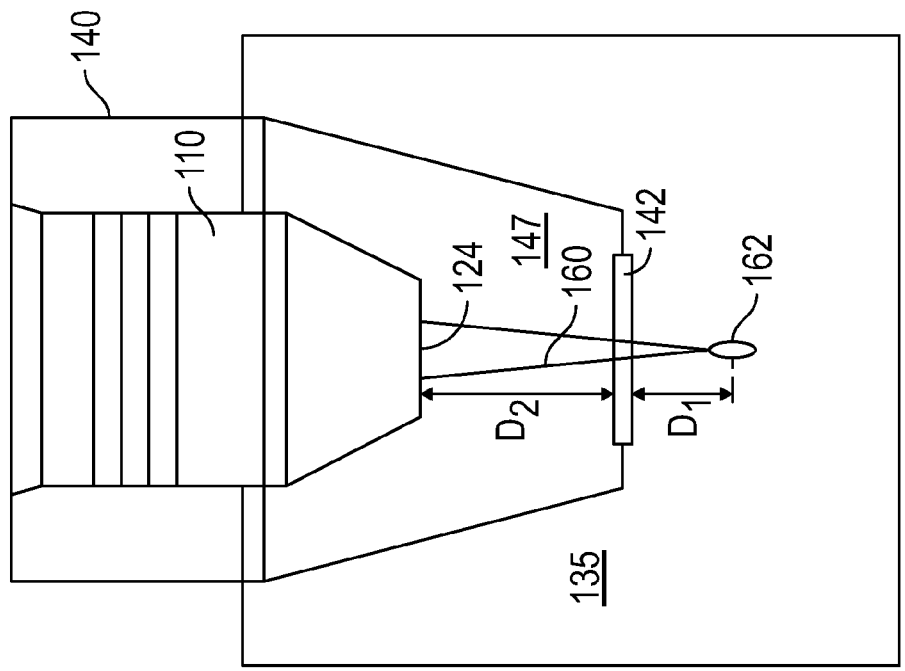
FIG. 4 is a schematic side view of a portion of an exemplary multiphoton curing arrangement in a liquid medium that is scattering and/or absorbing.
Figure 3B:
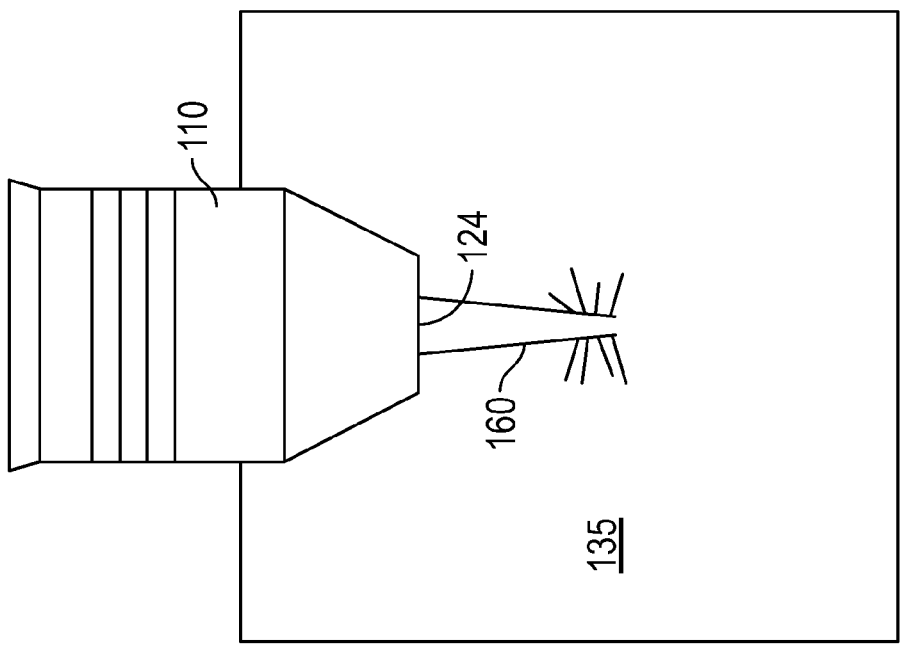
FIG. 3B is a schematic side view of a portion of a typical multiphoton curing arrangement in a liquid medium that is scattering and/or absorbing.

Referring now to FIG. 3A, a schematic side view is provided of a portion of a typical multiphoton curing arrangement in a typical liquid medium. A microscope objective 110 is shown semi-submersed in a liquid medium 130. A laser light 160 is emitted through the optical outlet 124 and has a focal point 162 located at a distance $D_0$ from the optical outlet 124. FIG. 3B is a schematic side view of a portion of a typical multiphoton curing arrangement in a liquid medium that is scattering, absorbing, or both. A microscope objective 110 is shown semi-submersed in a liquid medium 135 that is scattering and/or absorbing. A laser light 160 is emitted through the optical outlet 124, but does not have a focal point due to the scattering and/or absorbing of the liquid medium 135. FIG. 4, in contrast, is a schematic side view of a portion of an exemplary multiphoton curing arrangement in a liquid medium that is scattering and/or absorbing. A microscope objective 110 is shown semi-submersed in a liquid medium 135 that is scattering and/or absorbing and a protective element 140 is affixed to the microscope objective 110. A laser light 160 is emitted through the optical outlet 124, through an (optional) index-matching fluid 147, then through a transparent portion 142 of the protective element 140 and into the scattering and/or absorbing of the liquid medium 135. The distance between the optical outlet 124 and the transparent portion 142 is $D_2$. The laser light 160 has a focal point 162 located at a distance $D_1$ from the transparent portion 142. The distance $D_1$ of FIG. 4 is shorter than the distance $D_0$ of FIG. 3A (by approximately the distance $D_2$) and decreasing the distance allows the laser light 160 to achieve a focal point 162 despite passing through a portion of the scattering and/or absorbing of the liquid medium 135.

Regarding any method described above, the laser light optionally provides more than one focal point (e.g., three or more focal points forming a focal plane). Focal planes can be formed, such as using Digital Light Processing (DLP). In a DLP system, a two-dimensional cross section is projected to cure the desired section of an entire plane of liquid medium transverse to the laser light beam at one time.

Advantageously, a distance between the transparent portion of the protective element and the optical outlet of the microscope objective is adjustable. In some embodiments, the laser light has a focal length of 200 micrometers greater than a distance that the laser light travels into the liquid medium, 300 micrometers or greater, 400 micrometers or greater, 500 micrometers or greater, 600 micrometers or greater, 700 micrometers or greater, 800 micrometers or greater, 900 micrometers or greater, 1.0 mm or greater, 1.2 mm or greater, 1.4 mm or greater, 1.6 mm or greater, 1.8 mm or greater, 2.0 mm or greater, 2.2 mm or greater, 2.4 mm or greater, 2.6 mm or greater, 2.8 mm or greater, 3.0 mm or greater, 3.0 mm or greater, 3.2 mm or greater, or 3.4 mm or greater than a distance that the laser light travels into the liquid medium; and 5 mm or less than a distance that the laser light travels into the liquid medium. Stated another way, the laser light has a focal length of 200 micrometers to 5 mm greater than a distance that the laser light travels into the liquid medium, 500 micrometers to 5 mm, or 1 mm to 5 mm greater than a distance that the laser light travels into the liquid medium.

In some embodiments, the laser light travels into the scattering and/or absorbing liquid medium a distance of 10 micrometers or greater, 20 micrometers or greater, 30 micrometers or greater, 40 micrometers or greater, 50 micrometers or greater, 60 micrometers or greater, 70 micrometers or greater, 80 micrometers or greater, 90 micrometers or greater, or 100 micrometers or greater; and the laser light travels into the scattering and/or absorbing liquid medium a distance of 1 millimeter or less, 900 micrometers or less, 800 micrometers or less, 700 micrometers or less, 600 micrometers or less, 500 micrometers or less, 400 micrometers or less, 300 micrometers or less, 200 micrometers or less, or 150 micrometers or less. Stated another way, the laser light may travel into the scattering and/or absorbing liquid medium a distance of 10 micrometers to 1 mm, 50 micrometers to 1 mm, or 20 micrometers to 500 micrometers.

The method is summarized in FIG. 5, which shows a general flowchart comprising Step 510 of immersing a semi-submersible microscope objective in a liquid medium that is at least one of scattering or absorbing, the liquid medium comprising a polymerizable compound, a secondary component, and a multiphoton absorber; Step 520 of directing laser light through the semi-submersible microscope objective and into the liquid medium in an image-wise manner under conditions such that multiphoton absorption by the multiphoton absorber occurs, and at least partial polymerization of the polymerizable compound occurs resulting in an article; and Step 530 of removing uncured polymerizable compound to clean the article.

The secondary component in the liquid medium that provides scattering and/or absorbing can be a solid or a discontinuous (e.g., liquid) phase. When the secondary component is a discontinuous phase, it has a different refractive index than the polymerizable compound in the liquid medium. Often, the secondary component comprises a filler comprising a plurality of particles, fibers, or any combination thereof. Typically, the particles and/or fibers are dispersed in the liquid medium. Suitable particles for the filler comprise amorphous, semicrystalline, or crystalline particles selected from metal, ceramic, polymer, carbon, organic semiconductors, inorganic semiconductors, or combinations thereof. In an embodiment, the filler comprises ceramic fibers, metal particles, ceramic particles, zirconia particles, alumina particles, silica particles, polymer particles, fluoropolymer particles, carbon particles, organic semiconductor particles, inorganic semiconductor particles, or any combination thereof. Suitable fillers are described in more detail below. In some embodiments, the liquid medium containing a scattering and/or absorbing secondary component exhibits a minimum mismatch of refractive index between the polymerizable compound and the secondary component of 0.02 or greater, 0.03 or greater, 0.04 or greater, 0.05 or greater, 0.06 or greater, 0.07 or greater, 0.08 or greater, 0.09 or greater, 0.1 or greater, 0.12 or greater, 0.14 or greater, 0.15 or greater, 0.16 or greater, 0.18 or greater, 0.2 or greater, 0.25 or greater, 0.3 or greater, 0.35 or greater, 0.4 or greater, 0.45 or greater, 0.5 or greater, 0.55 or greater, 0.6 or greater, 0.65 or greater, 0.7 or greater, or 0.75 or greater; and 1.5 or less, 1 or less, 0.8 or less, 0.6 or less, 0.4 or less, or 0.2 or less. Stated another way, the liquid medium may exhibit a minimum mismatch of refractive index between the polymerizable compound and the secondary component of 0.02 to 1.5, 0.02 to 0.8, or 0.02 to 0.2.

In some embodiments, the liquid medium containing a scattering and/or absorbing secondary component exhibits a light penetration depth of 98% or less as compared to the same liquid medium without the secondary component, such as a light penetration depth of 97% or less, 96% or less, 95% or less, 94% or less, 92% or less, 90% or less, 88% or less, 86% or less, 84% or less, 82% or less, 80% or less, 75% or less, 70% or less, 65% or less, or even 60% or less; and 50% or more, as compared to the same liquid medium without the secondary component. The method can thus be useful for liquid media ranging from being only slightly scattering and/or absorbing to being strongly scattering and/or absorbing.

Data representing an article (e.g., an at least partially polymerized article) may be generated using computer modeling, such as computer aided design (CAD) data. Image data representing the article design can be exported in STL format, or in any other suitable computer processable format, to the additive manufacturing equipment. Scanning methods to scan a three-dimensional object may also be employed to create the data representing the article. One exemplary technique for acquiring the data is digital scanning. Any other suitable scanning technique may be used for scanning an article, including X-ray radiography, laser scanning, computed tomography (CT), magnetic resonance imaging (MRI), and ultrasound imaging. Other possible scanning methods are described, e.g., in U.S. Patent Application Publication No. 2007/0031791 (Cinader, Jr., et al.). The initial digital data set, which may include both raw data from scanning operations and data representing articles derived from the raw data, can be processed to segment an article design from any surrounding structures (e.g., a support for the article).

Figure 10:
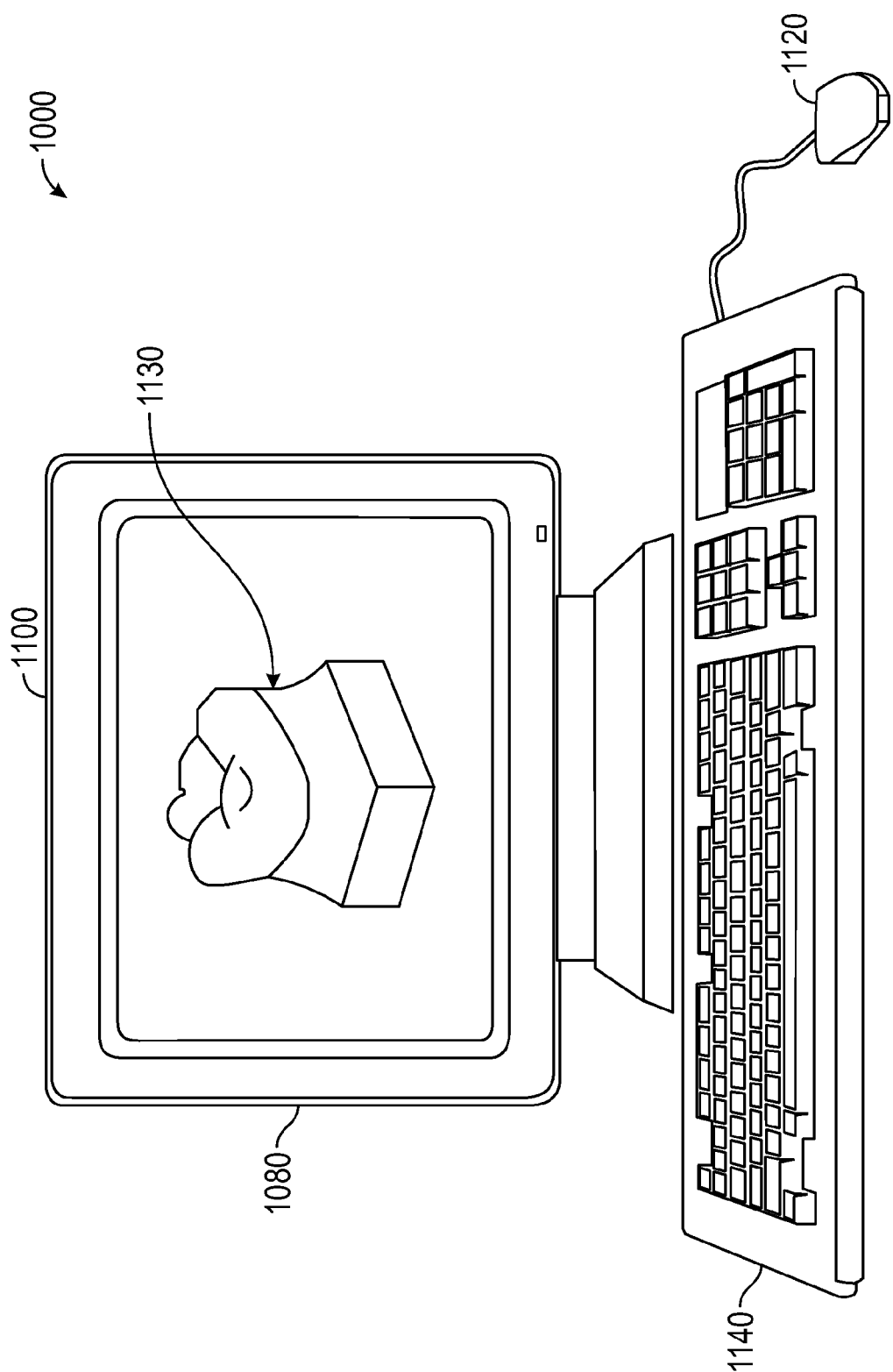
FIG. 10 is a schematic front view of an exemplary computing device 1000.

Often, machine-readable media are provided as part of a computing device. The computing device may have one or more processors, volatile memory (RAM), a device for reading machine-readable media, and input/output devices, such as a display, a keyboard, and a pointing device. Further, a computing device may also include other software, firmware, or combinations thereof, such as an operating system and other application software. A computing device may be, for example, a workstation, a laptop, a personal digital assistant (PDA), a server, a mainframe or any other general-purpose or application-specific computing device. A computing device may read executable software instructions from a computer-readable medium (such as a hard drive, a CD-ROM, or a computer memory), or may receive instructions from another source logically connected to computer, such as another networked computer. Referring to FIG. 10, a computing device 1000 often includes an internal processor 1080, a display 1100 (e.g., a monitor), and one or more input devices such as a keyboard 1140 and a mouse 1120. In FIG. 10, an article 1130 (e.g., a dental crown) is shown on the display 1100.

Figure 7:
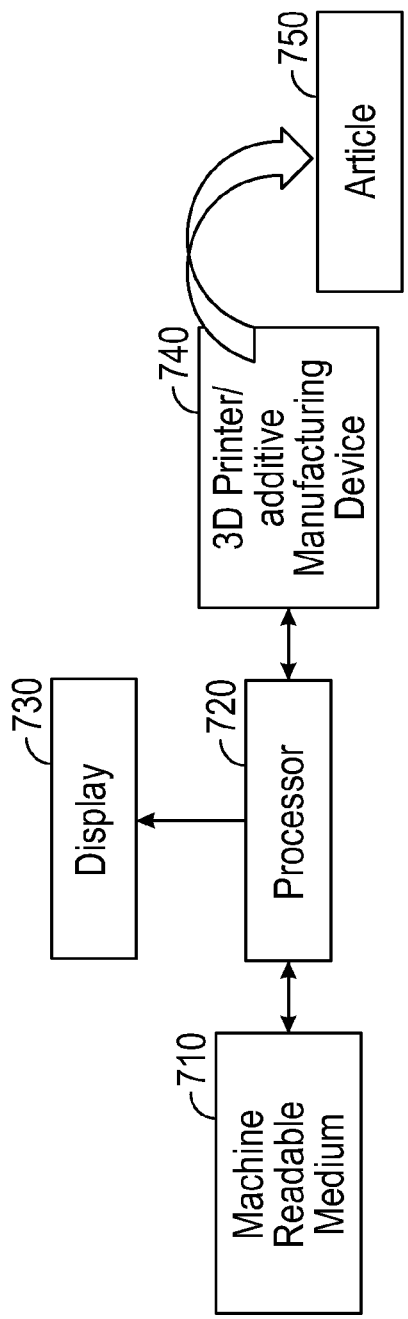
FIG. 7 is a block diagram of a generalized manufacturing process for an article.

Referring to FIG. 6, in certain embodiments, the present disclosure provides a system 600. The system 600 comprises a display 620 that displays a 3D model 610 of an article (e.g., an article 1130 as shown on the display 1100 of FIG. 10); and one or more processors 630 that, in response to the 3D model 610 selected by a user, cause a 3D printer/additive manufacturing device 650 to create a physical object of the article 660. In this case, the additive manufacturing device 650 comprises a microscope objective and a protective element. Often, an input device 640 (e.g., keyboard and/or mouse) is employed with the display 620 and the at least one processor 630, particularly for the user to select the 3D model 610. The article 660 comprises a gelled article obtained by at least partial polymerization of a liquid medium that is at least one of scattering or absorbing, the liquid medium comprising a polymerizable compound, a secondary component, and a multiphoton absorber. The components of the liquid medium are as discussed in detail above. Referring to FIG. 7, a processor 720 (or more than one processor) is in communication with each of a machine-readable medium 710 (e.g., a non-transitory medium), a 3D printer/additive manufacturing device 740, and optionally a display 730 for viewing by a user. The 3D printer/additive manufacturing device 740 is configured to make one or more articles 750 based on instructions from the processor 720 providing data representing a 3D model of the article 750 (e.g., a gelled article 1130 as shown on the display 1100 of FIG. 10) from the machine-readable medium 710. In this case, the additive manufacturing device 740 comprises a microscope objective and a protective element.

After an at least partially polymerized article has been formed, it is typically removed from the additive manufacturing apparatus, and at least some liquid medium containing uncured polymerizable compound is removed from the surface of the (gelled) article. At this stage, the three-dimensional article typically has sufficient green strength for handling in any remaining steps of the method. The article surface, as well as the bulk article itself, typically still retain uncured material, suggesting a need for further curing. Removing residual uncured polymerizable compound is particularly useful when the article is going to subsequently be post-cured, to minimize uncured residual material from undesirably curing directly onto the article. A "cured" article can comprise a polymerizable compound that has been at least partially polymerized and/or crosslinked. For instance, in some instances, an at least partially polymerized article is at least about 10% polymerized or crosslinked or at least about 30% polymerized or crosslinked. In some cases, an at least partially polymerized article is at least about 50%, at least about 70%, at least about 80%, or at least about 90% polymerized or crosslinked, for instance between about 10% and about 99% polymerized or crosslinked.

Further curing can be accomplished by further irradiating with actinic radiation, heating, or both. Optionally, that can be followed by soaking the article with another solvent (e.g., diethylene glycol ethyl ether or ethanol). Exposure to actinic radiation can be accomplished with any convenient radiation source, generally UV radiation, visible radiation, and/or e-beam radiation, for a time ranging from about 10 seconds to over 60 minutes. Heating is generally carried out at a temperature in the range of about 35-80° C., for a time ranging from about 10 to over 60 minutes in an inert atmosphere. So called post-cure ovens, which combine UV radiation and thermal energy, are particularly well suited for use in the post-cure process(es). In general, post curing improves the mechanical properties and stability of the three-dimensional article relative to the same three-dimensional article that is not post cured.

Figure 8:
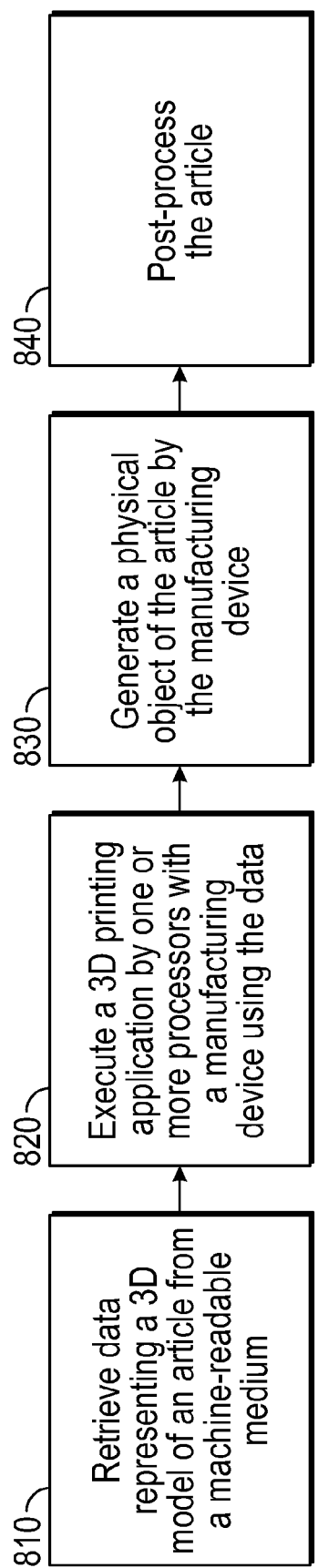
FIG. 8 is a high-level flow chart of an exemplary article manufacturing process.

Referring to FIG. 8, for example and without limitation, an additive manufacturing method comprises retrieving 810, from a (e.g., non-transitory) machine-readable medium, data representing a 3D model of an article (e.g., a gelled article) according to at least one embodiment of the present disclosure. The method further includes executing 820, by one or more processors, an additive manufacturing application interfacing with a manufacturing device using the data; and generating 830, by the manufacturing device, a physical object of the article. A gelled article is obtained by at least partial polymerization of a liquid medium that is at least one of scattering or absorbing, the liquid medium comprising a polymerizable compound, a secondary component, and a multiphoton absorber. One or more various optional post-processing steps 840 may be undertaken. Typically, the gelled article is at least cleaned with solvent and dried, plus may further be heat treated and/or sintered.

Figure 9:
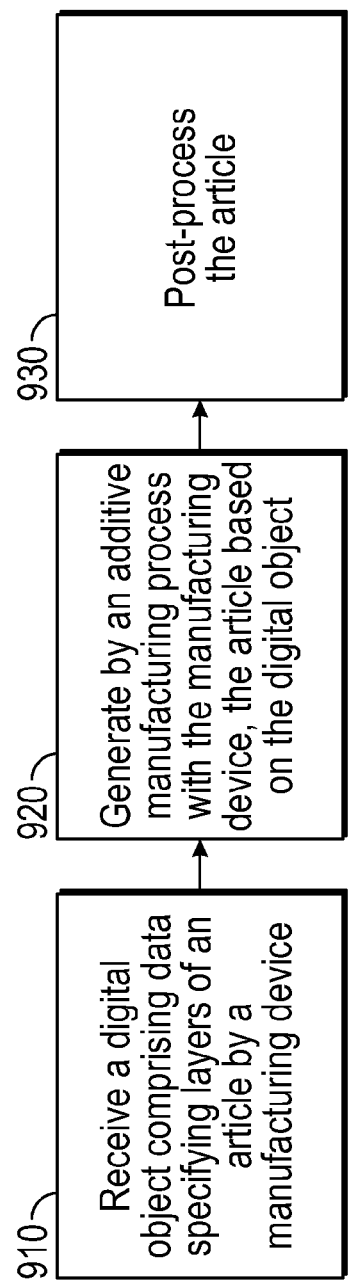
FIG. 9 is a high-level flow chart of an exemplary article additive manufacturing process.

Additionally, referring to FIG. 9, a method of making an article comprises receiving 910, by a manufacturing device having one or more processors, a digital object comprising data specifying a (e.g., gelled) article; and generating 920, with the manufacturing device by an additive manufacturing process, the article based on the digital object. Again, the article may undergo one or more steps of post-processing 930.

In some embodiments, the secondary component comprises a filler comprising ceramic particles, ceramic fibers, or a combination thereof, and the method further comprises burning out polymerized material and sintering the article to form a ceramic article. Optionally, such a ceramic article is an orthodontic article (e.g., brackets, buccal tubes, cleats, or buttons) or a dental restoration (e.g., crowns, bridges, inlays, onlays, veneers, facings, copings, etc.). When the article comprises a ceramic material, the article optionally exhibits a density of 95% or greater with respect to a theoretical density of the ceramic material, 96% or greater, 97% or greater, or 98% or greater with respect to a theoretical density of the ceramic material.

As noted above, at least certain embodiments of the present disclosure enable the direct fabrication of high-resolution final parts with little need for surface finishing. More particularly, the at least partially polymerized article of some embodiments exhibits a surface roughness of 1.0 micrometer $R_a$ or less, 0.9 micrometers $R_a$ or less, 0.8 micrometers $R_a$ or less, 0.7 micrometers $R_a$ or less, 0.6 micrometers $R_a$ or less, 0.5 micrometers $R_a$ or less, 0.4 micrometers $R_a$ or less, 0.3 micrometers $R_a$ or less, or 0.2 micrometers $R_a$ or less; and 0.1 micrometer $R_a$ or more. This especially solves a problem when the article has features that are too small to be effectively polished, e.g., by tumbling with a polishing agent. For instance, the article having low surface roughness may be an orthodontic article or a dental restoration, as noted above.

Polymer Particles

The liquid medium of the present disclosure optionally includes particles of at least one polymeric material as a secondary component. Typical polymer particle sizes are in a range of from about 0.01 micrometers (10 nm) to 100 micrometers for the largest dimension of the particle. In some embodiments, the average particle size is at least 20 nanometers (nm), 50 nm, 75 nm, 100 nm, or at least 200 nm, and 50 micrometers or less, 30 micrometers, 20 micrometers, 10 micrometers, 5 micrometers, or 1 micrometer or less. Suitable polymer particles include for instance and without limitation, particles formed of fluoropolymers, polyethylene, ethylene copolymers such as ethylene/polyolefin copolymers or ethylene/vinyl copolymers (e.g., ethylene vinyl acetate (EVA), ethylene methyl acrylate (EMA), and ethylene acrylic acid (EAA)), polypropylene, polymethylmethacrylate, (meth)acrylics, styrenics, polyvinyl acetate, styrene-butadiene rubbers, polyamides, polyesters, polyphenylene ether, polyphenylene sulfide, acrylonitrile-butadiene-styrene copolymer (ABS), or polyurethanes.

Suitable fluoropolymers amorphous fluoropolymers, fluorothermoplastic, and non-melt-processable fluoroplastic. The fluoropolymers can comprise interpolymerized units derived from at least one partially fluorinated or perfluorinated ethylenically unsaturated monomer represented by formula $R^aCF=CR^a$, wherein each $R^a$ is independently fluoro, chloro, bromo, hydrogen, a fluoroalkyl group (e.g., perfluoroalkyl having from 1 to 8, 1 to 4, or 1 to 3 carbon atoms and optionally interrupted by one or more oxygen atoms), a fluoroalkoxy group (e.g., perfluoroalkoxy having from 1 to 8, 1 to 4, or 1 to 3 carbon atoms, optionally interrupted by one or more oxygen atoms), alkyl having up to 10 carbon atoms, alkoxy having up to 8 carbon atoms, or aryl having up to 8 carbon atoms. Examples of useful fluorinated monomers represented by formula $R^aCF=CR^a$, include vinylidene fluoride (VDF), tetrafluoroethylene (TFE), hexafluoropropylene (HFP), chlorotrifluoroethylene, 2-chloropentafluoropropene, trifluorethylene, vinyl fluoride, dichlorodifluoroethylene, 1,1-dichlorofluoroethylene, 1-hydropentafluoropropylene, 2-hydropentafluoropopylene, tetrafluoropropylene, perfluoroalkyl perfluorvinyl ethers, perfluoroalkyl perfluoroallyl ethers, and mixtures thereof. Additional suitable fluoropolymers are described in detail in International Application Publication WO 2019/006266 (Bartow et al.).

In some embodiments, the liquid medium comprises 5 wt. % or greater polymer particles, based on the total weight of the liquid medium, 7 wt. % or greater, 10 wt. %, 12 wt. %, 15 wt. %, 17 wt. %, 20 wt. %, 22 wt. %, 25 wt. %, 27 wt. %, 30 wt. %, 32 wt. % or 35 wt. % or greater; and 60 wt. % or less, 55 wt. % or less, 50 wt. % or less, 45 wt. % or less, 40 wt. % or less, 38 wt. % or less, or 34 wt. % or less polymer particles, based on the total weight of the liquid medium. Stated another way, the liquid medium can include between 5 percent by weight and 60 percent by weight of polymer particles, based on the total weight of the liquid medium.

Metal Particles

The liquid medium of the present disclosure optionally includes particles of at least one metal material as a secondary component. Typical metal particle sizes are in a range of from about 0.05 micrometers (50 nm) to 100 micrometers for the largest dimension of the particle. In some embodiments, the average particle size is at least 75 nm, 100 nm, 200 nm, or at least 500 nm, and 50 micrometers or less, 30 micrometers, 20 micrometers, 10 micrometers, 5 micrometers, or 1 micrometer or less. Suitable metal particles include for instance and without limitation, particles formed of silver, gold, copper, aluminum, platinum, iron, zinc, tin, titanium, nickel, zirconium, or any alloy thereof.

Carbon Particles

The liquid medium of the present disclosure optionally includes particles of at least one carbon material as a secondary component. Typical carbon particle sizes are in a range of from about 0.001 micrometers (1 nm) to 100 micrometers for the largest dimension of the particle. In some embodiments, the average particle size is at least 10 nm, 50 nm, 75 nm, 100 nm, or at least 200 nm, and 50 micrometers or less, 30 micrometers, 20 micrometers, 10 micrometers, 5 micrometers, or 1 micrometer or less. Suitable carbon particles include for instance and without limitation, particles formed of carbon black, lamp black, graphite, activated carbon, or fullerenes (e.g., carbon nanotubes or buckeyballs).

Semiconductor Particles

The liquid medium of the present disclosure optionally includes particles of at least one semiconductor material as a secondary component. Typical semiconductor particle sizes are in a range of from about 0.01 micrometers (10 nm) to 100 micrometers for the largest dimension of the particle. In some embodiments, the average particle size is at least 20 nm, 50 nm, 75 nm, 100 nm, or at least 200 nm, and 50 micrometers or less, 30 micrometers, 20 micrometers, 10 micrometers, 5 micrometers, or 1 micrometer or less. Suitable inorganic semiconductor particles include for instance and without limitation, particles formed of silicon, gallium, arsenide, sulfur, selenium, tellurium, boron, indium, cadmium, lead, thallium, or complexes thereof. Suitable organic semiconductor particles include for instance and without limitation, particles formed of polymers having conjugated bonds, aromatic compounds (e.g., naphthalene, anthracene, or violanthrene), or some organic dyes or pigments.

Ceramic Particles

The liquid medium of the present disclosure optionally includes particles of at least one ceramic material as a secondary component. In many embodiments, such ceramic particles comprise metal oxide ceramic particles, non-oxide ceramic particles, or any combination thereof.

Preferably, the ceramic particles are selected from the group consisting of zirconia ($ZrO_2$), silica ($SiO_2$), alumina ($Al_2O_3$), yttria ($Y_2O_3$), ceria ($CeO_2$), magnesium-magnesia aluminate (MMA), magnesium oxide (MgO), hydroxyapatite ($Ca_5(PO_4)_3OH$), fluorapatite ($Ca_5(PO_4)_3F$), chlorapatite ($Ca_5(PO_4)_3Cl$), calcite ($CaCO_3$), cordierite ($Mg_2Al_4Si_5O_{18}$), silicon carbide (SiC), silicon nitride ($Si_3N_4$), boron carbide ($B_4C$), titanium diboride ($TiB_2$), zirconium diboride ($ZrB_2$), boron nitride (BN), titanium carbide (TiC), zirconium carbide (ZrC), aluminium nitride (AlN), calcium hexaboride ($CaB_6$), MAX phase ($M_{n+1}AX_{n1}$), and any combination thereof. In select embodiments, high-purity particles are used, in which the total content of metal impurities is preferably less than 100 ppm, particularly preferably less than 50 ppm. In alternate embodiments, particles are used having a total content of metal impurities of about 2,000 ppm.

In certain embodiments, the ceramic particles may include a nano-filler. Optionally, the nano-filler comprises nano-cluster(s). One or more different kinds of nano-cluster(s) can be present. It has been found that compared to other fillers, using nano-cluster(s) can be beneficial because it allows for the formulation of a composition with high filler load resulting in better mechanical properties, e.g. polishability or abrasion and in higher aesthetics. The nano-cluster, if present, can typically be characterized by at least one or all of the following features:

Specific surface area: from 30 to 400 or from 60 to 300 or from 80 to 250 $m^2/g$, comprising particles of $SiO_2$, $ZrO_2$, $Al_2O_3$ and mixtures thereof.

If desired, the specific surface area of the nano-cluster can be determined according to the method of Brunauer, Emmet and Teller (BET), using a measurement device (e.g., MONOSORB, available from Quantachrome Instruments (Boynton Beach, FL)).

Suitable zirconia particles include for instance and without limitation, nano-sized zirconia particles(s) having at least one and up to all of the following parameters or features:

Primary particle size XRD (diameter): from 2 to 100 nm, 2 to 50 nm, 2 to 20 nm, 2 to 15 nm, or 4 to 15 nm;

being essentially spherical, cuboid or a mixture of spherical and cuboid;

being non-associated;

being crystalline;

not being coated with an inorganic coloring agent.

Suitable nano-sized zirconia particles can have at least one and up to all of the following features:

$ZrO_2$ content: from 70 to 100 mol % or 80 to 97 mol %;

$HfO_2$ content: from 0 to 4.5 mol %, 0 to 3 mol %, or 0.1 to 2.8 mol %;

Stabilizer selected from $Y_2O_3$, $CeO_2$, MgO, CaO, $La_2O_3$ or a combination thereof in an amount from 0 to 30 mol %, 1.5 to 16 mol %, 2 to 10 mol %, or 2 to 5 mol %;

Al$_2$O$_3$ content: from 0 to 1 mol % or from 0.005 to 0.5 mol % or from 0.01 to 0.2 mol %.

According to one embodiment, the nano-sized zirconia particles are characterized as follows: ZrO$_2$ content: from 70 to 98.4 mol %; HfO$_2$ content: from 0.1 to 2.8 mol %; Y$_2$O$_3$ content: from 1.5 to 28 mol %.

Nano-sized zirconia particles can be obtained or are obtainable by a process comprising the steps of hydrothermal treatment of an aqueous metal salt solution or suspension (e.g. zirconium salt, yttrium salt). Such a process is described in WO 2013/055432 (Kolb et al.).

Suitable silica particles include for instance and without limitation spherical silica particles and non-spherical silica particles. Spherical silica particles in aqueous media (sols) are well known in the art and are available commercially; for example, as silica sols in water or aqueous alcohol solutions under the trade designations LUDOX from W.R. Grace & Co. (Columbia, MD), NYACOL from Nyacol Nanotechnologies Inc. (Ashland, MA), or NALCO from Nalco Company (Naperville, IL). One useful silica sol with a volume average particle size of 5 nm, a pH of 10.5, and a nominal solids content of 15 percent by weight, is available as NALCO 2326 from Nalco Company. Other useful commercially available silica sols include those available as NALCO 1115 and NALCO 1130 from Nalco Company, as REMASOL SP30 from Remet Corp. (Utica, NY), and as LUDOX SM from W.R. Grace & Co. Other suitable silica particles include fumed silica. Agglomerated silica particles are commercially available e.g. from Degussa, Cabot Corp or Wacker under the product designation AEROSIL, CAB-O-SIL and HDK. The specific surface of the hydrophobic fumed silica is typically from 100 to 300 m$^2$/g or from 150 to 250 m$^2$/g. A mixture of different fumed silica can be used, if desired. For example, a mixture of fumed silica the surface of which has been treated with a hydrophobic surface treating agent and fumed silica the surface of which has been treated with a hydrophilic surface treating agent can be used. A suitable nano-silica comprising aggregated nano-sized particles can be produced according to the processes described e.g. in U.S. Pat. No. 6,730,156 (Zhang et al; preparatory example A).

Suitable alumina particles include for instance and without limitation aqueous alumina dispersions (e.g., average particle size of 500 nm alumina particles available from Sumitomo Chemicals (New York, NY)) and alumina particles from Saint-Gobain Surface Conditioning Group (Anaheim, CA).

Suitable yttria particles include for instance and without limitation yttrium oxide available from Treibacher Industrie AG (Althofen, Austria).

Suitable ceria particles include for instance and without limitation colloidal cerium oxide in the form of colloidal sols and nano-structured powders available from NYACOL Nano Technologies, Inc (Ashland, MA). NYACO CDP, for example, has a particle size of 25-30 nm and is a dispersible ceria powder, while NYACOL Ce120/10 is colloidal ceria having a particle size of 100-140 nm and water as a carrier.

Suitable magnesium-magnesia aluminate particles include for instance and without limitation magnesium aluminate spinel in the form of nano-structured powders available from American Elements (Los Angeles, CA). 99.9% Magnesium Aluminate, Spinel Nanopowder, for example, has a nominal particle size of less than 50 nm. Larger particle powders are available from Reade International, Corp (Riverside, RI) as Spinel Powder (MgAl$_2$O$_4$), with a particle size of 1-5 micrometers.

Suitable magnesium oxide particles include for instance and without limitation particles in the form of a water dispersion. It should be understood, however, that a certain amount of magnesium oxide converts to magnesium hydroxide in the presence of water. Preferred magnesium oxide dispersions are made from commercially available magnesium oxide such as ELASTOMAG 170 from Martin Marietta Magnesia Specialties, LLC (Baltimore, MD) and MAGLITE A from Hallstar (Chicago, IL). Magnesium oxides may be dispersed by those skilled in the art or obtained from vendors such as Tiarco Chemical and H. M. Royal.

Suitable apatite particles include for instance and without limitation, hydroxyapatite, fluorapatite and chlorapatite, with high concentrations of OH—, F— and Cl— ions, respectively, in the crystal. For example, suitable hydroxyapatite particles include for instance and without limitation hydroxyapatite from CAM Bioceramics (Leiden, The Netherlands). Hydroxyapatite has been used as a bone substitute because natural bone is approximately 70% hydroxyapatite by weight and 50% hydroxyapatite by volume. Hydroxyapatite has also been widely used for various implant applications such as bioactive space fillers, as scaffolding for the in-growth of tissues, and as a coating for implants to promote bonding with tissue. Syntheses of chlorapatite and fluorapatite have been reported in the literature, such as in Sanjeevi et al., Journal of the European Ceramic Society, 2007, 27, 2287-2294; Montazeri et al., International Journal of Nanomedicine, 2011, 6, 197-201; and Ghomi et al., Materials Research Innovations, 2013, 17:4, 257-262.

Suitable calcite particles include for instance and without limitation calcite nanoparticles commercially available under the trade designations "MULTIFEX MM" and "ALBAFIL" from the Cary Company (Addison, IL); "SOCAL 31" from Solvay Specialty Chemicals, LTD. (Houston, TX); and "NPCC-111" and "NPCC-113" from NanoMaterials Technology LTD (Singapore).

Suitable cordierite particles include for instance and without limitation cordierite particles commercially available from Reade International, Corp (Riverside, RI) as Cordierite powder with an average particle size of 6-7 micrometers, and from American Elements (Los Angeles, CA) as Cordierite or Magnesium Aluminum Silicate.

Suitable silicon nitride particles include for instance and without limitation powders having a mean particle or agglomerate size (D$_{50}$) of 0.5-20 micrometers, such as 1-10 micrometers. The oxygen content of silicon nitride powder is preferably less than 2% by weight and the total carbon content is preferably less than 0.35% by weight. A commercially available silicon nitride powder can be obtained under the trade designation SILZOT from AlzChem Group AG (Trastber, Germany).

Suitable boron carbide particles include for instance and without limitation, B$_4$C powders having a purity of 97% by weight or higher, and a mean particle size (D$_{50}$) of 0.1-8 micrometers. An example of a suitable boron carbide powder is 3M Boron Carbide Powder commercially available from 3M Company (St. Paul, MN).

Suitable titanium diboride particles include for instance and without limitation, TiB$_2$ powders having a mean particle size (D$_{50}$) of about 2-20 micrometers. An example of a suitable titanium diboride powder is 3M Titanium Diboride Powder commercially available from 3M Company.

Suitable zirconium diboride particles include for instance and without limitation, high purity or ultra-high purity ZrB$_2$ powders available from American Elements (Los Angeles, CA).

Suitable boron nitride particles include for instance and without limitation, agglomerates of platelet-shaped, hexagonal boron nitride primary particles, wherein the hexagonal boron nitride primary particles are connected to one another by means of an inorganic binding phase. The inorganic binding phase comprises at least one nitride and/or oxynitride. The nitrides or oxynitrides are preferably compounds of the elements aluminum, silicon, titanium and boron. An example of a suitable boron nitride powder is 3M Boron Nitride Cooling Fillers Platelets commercially available from 3M Company.

Suitable titanium carbide particles include for instance and without limitation, TiC powders having a mean particle size ($D_{50}$) of 1 to 3 micrometers. An example of a suitable titanium carbide powder is TiC Grade High Vacuum 120 commercially available from HC-Starck (Munich, Germany).

Suitable zirconium carbide particles include for instance and without limitation, ZrC powders having a mean particle size ($D_{50}$) of 3 to 5 micrometers. An example of a suitable zirconium carbide powder is ZrC Grade B commercially available from HC-Starck.

Suitable aluminum nitride particles include for instance and without limitation, AlN powders having a mean particle size ($D_{50}$) of 0.8 to 2 micrometers. An example of a suitable aluminum nitride powder is AlN Grade C commercially available from HC-Starck.

Suitable calcium hexaboride particles include for instance and without limitation, $CaB_6$ powders commercially available from 3M Company as 3M Calcium Hexaboride.

MAX phase particles are layered hexagonal carbides and nitrides having the general formula of $M_{n+1}AX_n$, wherein n=1 to 3, M is an early transition metal, A is an A-group element, and X is independently selected from carbon and nitrogen. The A-group elements are preferably elements 13-16. An example of a suitable MAX phase powder is MAXTHAL 312 powder commercially available from Kanthal (Hallstahammar, Sweden).

In some embodiments, the liquid medium comprises 20 wt. % or greater ceramic particles, based on the total weight of the liquid medium, 21 wt. % or greater, 22 wt. %, 23 wt. %, 24 wt. %, 25 wt. %, 26 wt. %, 27 wt. %, 28 wt. %, 29 wt. %, 30 wt. %, 32 wt. % or 35 wt. % or greater; and 60 wt. % or less, 29.5 wt. % or less, 28.5 wt. % or less, 27.5 wt. % or less, 26.5 wt. % or less, 25.5 wt. % or less, or 24.5 wt. % or less ceramic particles, based on the total weight of the liquid medium. Stated another way, the liquid medium can include between 20 percent by weight and 60 percent by weight of ceramic particles, based on the total weight of the liquid medium.

In some embodiments, the liquid medium comprises 3 volume percent (vol. %) or greater ceramic particles, based on the total volume of the liquid medium, 4 vol. %, 5 vol. %, 6 vol. %, 7 vol. %, 8 vol. %, 9 vol. %, 10 vol. %, 11 vol. %, 12 vol. %, 13 vol. %, 14 vol. %, 15 vol. %, 17 vol. %, 19 vol. %, 21 vol. %, 23 vol. %, 25 vol. % or 29 vol. % or greater; and 45 vol. % or less, 44 vol. %, 42 vol. %, 40 vol. %, 38 vol. %, 36 vol. %, 34 vol. %, 32 vol. %, or 30 vol. % or less ceramic particles, based on the total volume of the liquid medium. Stated another way, the liquid medium can include for instance, between 3 percent by volume and 45 percent by volume of ceramic particles, 5 vol. % to 45 vol. %, or 10 vol. % to 45 vol. % ceramic particles, based on the total volume of the liquid medium.

The ceramic particles typically comprise an average (mean) particle size diameter (i.e., $D_{50}$) of 1 nanometer (nm) or greater, 3 nm, 4 nm, 5 nm, 6 nm, 7 nm, 8 nm, 9 nm, 10 nm, 12 nm, 15 nm, 17 nm, 20 nm, 25 nm, 30 nm, 40 nm, 50 nm, 60 nm, 75 nm, 90 nm, 100 nm, 125 nm, 150 nm, 175 nm, 200 nm, 225 nm, 250 nm, 350 nm, 500 nm, 750 nm, 1 micrometer, 1.25 micrometers, 1.5 micrometers, 1.75 micrometers, 2 micrometers, 2.5 micrometers, 3.0 micrometers, 3.5 micrometers, 4.0 micrometers, or 4.5 micrometers or greater; and a $D_{50}$ of 10 micrometers or less, 9.5 micrometers, 9 micrometers, 8.5 micrometers, 8 micrometers, 7.5 micrometers, 7 micrometers, 6.5 micrometers, 6 micrometers, 5.5 micrometers, 5 micrometers, 4.5 micrometers, 3 micrometers, 2 micrometers, 1.5 micrometers, 1 micrometer, 900 nm, 800 nm, 700 nm, 600 nm, 500 nm, 400 nm, 300 nm, or 250 nm or less. Stated another way, the ceramic particles may have an average particle size diameter ($D_{50}$) of 1 nm to 900 nm, 1 nm to 500 nm, 1 nm to 250 nm, 250 nm to 10 micrometers, 1 micrometer to 10 micrometers, 500 nanometers to 1.5 micrometers, or of 250 nm to 1 micrometer. The average (mean) particle size ($D_{50}$) refers to that particle diameter at which 50 percent by volume of the particles in a distribution of particles have that diameter or a smaller diameter, as measured by laser diffraction. Preferably, the average particle size is of the primary particles.

Ceramic Fibers

The liquid medium of the present disclosure optionally includes at least one ceramic fiber. Suitable ceramic fibers include for instance and without limitation, alumina fibers, alumina-silica fibers, aluminum borosilicate fibers, zirconia-silica fibers, borosilicate glass fibers, silicate fibers modified with alkalis or alkaline earths, fused silica fibers, leached silica fibers, quartz fibers, or fiberglass.

Sintering Aid

The liquid medium of the present disclosure optionally includes at least one sintering aid when forming a ceramic article. Often, sintering aids assist by removing oxygen during the sintering process. Also, a sintering aid may provide a phase that melts from a solid to a liquid at a lower temperature than the ceramic material, or may provide some alternate mechanism that improves transport of ceramic ions and thus increases densification as compared to a composition not containing the sintering aid.

Suitable sintering aids are not particularly limited, and may include rare earth oxides, alkaline earth oxides, alkali oxides, and combinations thereof. Materials that yield liquids at the sintering temperature of the ceramic particles can be useful.

Rare earth oxides include cerium oxide (e.g., $CeO_2$), dysprosium oxide (e.g., $Dy_2O_3$), erbium oxide (e.g., $Er_2O_3$), europium oxide (e.g., $Eu_2O_3$), gadolinium oxide (e.g., $Gd_2O_3$), holmium oxide (e.g., $Ho_2O_3$), lanthanum oxide (e.g., $La_2O_3$), lanthanum aluminum oxide ($LaAlO_3$), lutetium oxide (e.g., $Lu_2O_3$), neodymium oxide (e.g., $Nd_2O_3$), praseodymium oxide (e.g., $Pr_6O_{11}$), samarium oxide (e.g., $Sm_2O_3$), terbium oxide (e.g., $Tb_2O_3$), thorium oxide (e.g., $Th_4O_7$), thulium oxide (e.g., $Tm_2O_3$), ytterbium oxide (e.g., $Yb_2O_3$), and yttrium oxide (e.g., $Y_2O_3$), and combinations thereof.

Alkaline earth oxides include barium oxide (BaO), calcium oxide (CaO), strontium oxide (SrO), magnesium oxide (MgO), and beryllium oxide (BeO), and combinations thereof.

Alkali oxides include lithium oxide ($Li_2O_2$), sodium oxide ($Na_2O_2$), potassium oxide ($K_2O$), rubidium oxide ($Rb_2O$), and cesium oxide ($Cs_2O$), and combinations thereof.

In some embodiments, a mixture of an alkaline earth oxide and a rare earth oxide is preferable, such as a combination of aluminum oxide and yttrium oxide.

Additional suitable sintering aids include for instance and without limitation, boron, carbon, magnesium, aluminum, silicon, titanium, vanadium, chromium, iron, nickel, copper, aluminum nitride, alumina, yttria, ethyl silicate, sodium silicate with $Mg(NO_3)_2$, other glasses, $Fe_2O_3$, $MgF_2$, and combinations thereof.

In some embodiments, suitable sintering aids comprise aluminum oxide, yttrium oxide, zirconium oxide, silicon oxide, titanium oxide, magnesium oxide, calcium oxide, strontium oxide, barium oxide, lithium oxide, sodium oxide, potassium oxide, carbon, boron, boron carbide, aluminum, aluminum nitride, or combinations thereof. For instance, suitable commercially available sintering aids include Calcined Alumina from Almatis (Ludwigshafen, Germany) and Yttrium Oxide from Treibacher Industrie AG (Althofen, Austria).

Coloring Agents

The liquid medium according to embodiments of the present disclosure may further comprise one or more inorganic coloring agent(s). The nature and structure of the inorganic coloring agent(s) is not particularly limited, unless the desired result cannot be achieved. In preferred embodiments, the metal ion is not a free salt, but rather is incorporated into the ceramic particles. Up to 30 mole %, up to 25 mole %, up to 20 mole %, up to 10 mole %, up to 5 mole %, up to 2 mole %, or up to 1 mole % of the ceramic particles can be $Y_2O_3$, $La_2O_3$, $Al_2O_3$, $CeO_2$, $Pr_2O_3$, $Nd_2O_3$, $Pm_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$, $Fe_2O_3$, $MnO_2$, $Co_2O_3$, $Cr_2O_3$, NiO, CuO, $V_2O_3$, $Bi_2O_3$, $Ga_2O_3$, $Lu_2O_3$, $HfO_2$, or mixtures thereof. Inorganic oxides such as $Fe_2O_3$, $MnO_2$, $Co_2O_3$, $Cr_2O_3$, NiO, CuO, $Ga_2O_3$, $Er_2O_3$, $Pr_2O_3$, $Eu_2O_3$, $Dy_2O_3$, $Sm_2O_3$, $V_2O_3$, or $W_2O_3$ may be added, for example, to alter the color of the ceramic article to be produced.

If the liquid medium is to be used for producing dental or orthodontic articles, the following inorganic coloring agent(s) were found to be useful: salts of Mn, Fe, Cu, Pr, Nd, Sm, Eu, Tb, Dy, Er, Bi and mixtures thereof, preferably Er, Tb, Mn, Bi, Nd or Fe, Pr, Co, Cr or V, Cu, Eu, Sm, Dy, with Er, Tb, Mn, Bi, Nd being sometimes particularly preferred. Including a coloring agent may be particularly desirable when the ceramic particles comprise zirconia.

If present, the inorganic coloring agent(s) is present in an amount, based on the moles of the coloring ion being present in the coloring agent and with respect to the total moles of inorganic oxide in the ceramic particles, of 0.001 mole % or greater, 0.005 mole %, or 0.01 mole % or greater; and 0.02 mole % or less, 0.05 mole %, or 0.5 mole % or less.

Secondary Absorbing Material

In select embodiments, the liquid medium further comprises a secondary absorbing material that is different from the multiphoton absorber. It is to be understood that the secondary material is not restricted to acting as an absorber, but also encompasses materials that control voxel size via other interactions (e.g., by chemically neutralizing free radicals). A secondary absorbing material may be employed to control the depth of penetration of the laser light. Advantageously, controlling the depth of laser light penetration can improve definition of the voxel formed during multiphoton reaction in the z-direction, as compared to not controlling the depth of laser light penetration. Suitable secondary absorbing materials include near-IR absorbers (e.g., "FDN-002" commercially available from Yamada Chemical Co., Ltd. (Kyoto, Japan) and "LUNIR6" commercially available from Luminochem (Budapest, Hungary)), matched to the laser wavelength. Optical brighteners and UV absorbers matched to the two-photon absorption, hindered amine light stabilizers (HALS), inhibitors (e.g., butylated hydroxytoluene (BHT)), or any combination thereof, may be useful to act to shrink the voxel size in all directions.

Optical brighteners are chemical compounds that absorb light in the ultraviolet and violet region (usually 340-370 nanometers (nm)) of the electromagnetic spectrum, and re-emit light in the blue region (typically 420-470 nm) by fluorescence. Useful optical brighteners are commercially available under the trade designation "BENETEX OB-M1" from Mayzo, Inc. (Suwanee, GA) and under the trade designation "TINOPAL CBS" from BASF (Ludwigshafen, Germany). A suitable HALS is bis(1,2,2,6,6-pentamethyl-4-piperidinyl) [3,5-bis(1,1-dimethylethyl-4-hydroxyphenyl) methyl]butylpropanedioate, available as TINUVIN 144, from CIBA-GEIGY Corporation (Hawthorne, NY). Suitable UV absorbers include for instance, bis(1,2,2,6,6-pentamethyl-4-piperidinyl)(3,5-bis(1,1-dimethylethyl 1-4-hydroxyphenyl)methyl) butylpropanedioate, 2-ethylhexyl-2-cyano-3,3'-diphenylacrylate, 2-hydroxyl-4-n-octoxybenzophenone, 2-(2'-hydroxy-5'-methylphenyl) benzotriazole, poly(oxy-1,2-ethanediyl), alpha-(3-(3-(2H-benzotriazol-2-yl)-5-(1,1-dimethylethyl)-4-hydroxylphenyl-)-1-oxopropyl)-omega-hydroxy, and UVINUL D-50 and UVINUL MS-40, sold by BASF Wyandotte Inc. (Parsippany, NJ).

SELECT EMBODIMENTS OF THE PRESENT DISCLOSURE

In a first embodiment, the present disclosure provides a multiphoton imaging method. The method comprises a) immersing a semi-submersible microscope objective in a liquid medium that is at least one of scattering or absorbing; b) directing laser light through the semi-submersible microscope objective and into the liquid medium in an image-wise manner under conditions such that multiphoton absorption by the multiphoton absorber occurs, and at least partial polymerization of the polymerizable compound occurs resulting in an article; and c) removing uncured polymerizable compound to clean the article. The liquid medium comprises a polymerizable compound, a secondary component, and a multiphoton absorber. The semi-submersible microscope objective comprises i) a microscope objective having a protective barrel with an optical inlet and optical outlet; and ii) a protective element affixed to the microscope objective, sealing the optical outlet but not the optical inlet. A transparent portion of the protective element is aligned with the optical outlet, and the protective element is separable from the microscope objective without damaging the microscope objective.

In a second embodiment, the present disclosure provides a method according to the first embodiment, wherein a distance between the transparent portion of the protective element and the optical outlet of the microscope objective is adjustable.

In a third embodiment, the present disclosure provides a method according to the first embodiment or the second embodiment, wherein the secondary component comprises a filler comprising a plurality of particles, fibers, or a combination thereof.

In a fourth embodiment, the present disclosure provides a method according to the third embodiment, wherein the filler comprises amorphous, semicrystalline, or crystalline particles selected from metal, ceramic, polymer, carbon, organic semiconductors, inorganic semiconductors, or a combination thereof.

In a fifth embodiment, the present disclosure provides a method according to the third embodiment or the fourth embodiment, wherein the filler is dispersed in the liquid medium.

In a sixth embodiment, the present disclosure provides a method according to any of the third to fifth embodiments, wherein the filler comprises metal particles.

In a seventh embodiment, the present disclosure provides a method according to any of the third to sixth embodiments, wherein the filler comprises ceramic particles.

In an eighth embodiment, the present disclosure provides a method according to any of the third to seventh embodiments, wherein the filler comprises zirconia particles.

In a ninth embodiment, the present disclosure provides a method according to any of the third to eighth embodiments, wherein the filler comprises alumina particles.

In a tenth embodiment, the present disclosure provides a method according to any of the third to ninth embodiments, wherein the filler comprises silica particles.

In an eleventh embodiment, the present disclosure provides a method according to any of the third to tenth embodiments, wherein the filler comprises polymer particles.

In a twelfth embodiment, the present disclosure provides a method according to any of the third to eleventh embodiments, wherein the filler comprises fluoropolymer particles.

In a thirteenth embodiment, the present disclosure provides a method according to any of the third to twelfth embodiments, wherein the filler comprises carbon particles.

In a fourteenth embodiment, the present disclosure provides a method according to any of the third to thirteenth embodiments, wherein the filler comprises organic semiconductor particles.

In a fifteenth embodiment, the present disclosure provides a method according to any of the third to fourteenth embodiments, wherein the filler comprises inorganic semiconductor particles.

In a sixteenth embodiment, the present disclosure provides a method according to any of the third to fifteenth embodiments, wherein the filler comprises ceramic fibers.

In a seventeenth embodiment, the present disclosure provides a method according to any of the first to sixteenth embodiments, wherein the liquid medium exhibits a minimum mismatch of refractive index between the polymerizable compound and the secondary component of 0.02 or greater, 0.03 or greater, 0.04 or greater, 0.05 or greater, 0.06 or greater, 0.07 or greater, 0.08 or greater, 0.09 or greater, 0.1 or greater, 0.12 or greater, 0.14 or greater, 0.15 or greater, 0.16 or greater, 0.18 or greater, 0.2 or greater, 0.25 or greater, 0.3 or greater, 0.35 or greater, 0.4 or greater, 0.45 or greater, 0.5 or greater, 0.55 or greater, 0.6 or greater, 0.65 or greater, 0.7 or greater, or 0.75 or greater.

In an eighteenth embodiment, the present disclosure provides a method according to any of the first to seventeenth embodiments, wherein the liquid medium exhibits a light penetration depth of 98% or less as compared to the same medium without the secondary component.

In a nineteenth embodiment, the present disclosure provides a method according to any of the first to eighteenth embodiments, further comprising index-matched fluid disposed between the optical outlet and the transparent portion of the protective element.

In a twentieth embodiment, the present disclosure provides a method according to any of the first to nineteenth embodiments, wherein the microscope objective has a numerical aperture of 1.4 or less, 1.3 or less, 1.2 or less, 1.1 or less, 1 or less, 0.9 or less, 0.8 or less, 0.7 or less, 0.6 or less, 0.5 or less, 0.4 or less, or 0.3 or less.

In a twenty-first embodiment, the present disclosure provides a method according to any of the first to twentieth embodiments, wherein the transparent portion of the protective element comprises glass, quartz, sapphire, plastic, diamond, silicon mononitride, alumina, or a combination thereof.

In a twenty-second embodiment, the present disclosure provides a method according to the twenty-first embodiment, wherein the transparent portion of the protective element comprises a cylindrical lens.

In a twenty-third embodiment, the present disclosure provides a method according to any of the first to twenty-second embodiments, wherein the liquid medium further comprises a secondary absorbing material.

In a twenty-fourth embodiment, the present disclosure provides a method according to any of the first to twenty-third embodiments, wherein the laser light travels into the liquid medium a distance of 10 micrometers or greater, 20 micrometers or greater, 30 micrometers or greater, 40 micrometers or greater, 50 micrometers or greater, 60 micrometers or greater, 70 micrometers or greater, 80 micrometers or greater, 90 micrometers or greater, or 100 micrometers or greater; and the laser light travels into the liquid medium a distance of 1 millimeter or less, 900 micrometers or less, 800 micrometers or less, 700 micrometers or less, 600 micrometers or less, 500 micrometers or less, 400 micrometers or less, 300 micrometers or less, 200 micrometers or less, or 150 micrometers or less.

In a twenty-fifth embodiment, the present disclosure provides a method according to any of the first to twenty-fourth embodiments, wherein a field of view of the microscope objective is 100 micrometers or greater, 200 micrometers or greater, 300 micrometers or greater, 400 micrometers or greater, 500 micrometers or greater, 600 micrometers or greater, 700 micrometers or greater, 800 micrometers or greater, 900 micrometers or greater; and the field of view of the microscope objective is 10 millimeters (mm) or less, 8 mm or less, 6 mm or less, 4 mm or less, 3 mm or less, 2.5 mm or less, 2 mm or less, 1.5 mm or less, or 1 mm or less.

In a twenty-sixth embodiment, the present disclosure provides a method according to any of the first to twenty-fifth embodiments, wherein the laser light has a focal length of 200 micrometers greater than a distance that the laser light travels into the liquid medium, 300 micrometers or greater, 400 micrometers or greater, 500 micrometers or greater, 600 micrometers or greater, 700 micrometers or greater, 800 micrometers or greater, 900 micrometers or greater, 1.0 mm or greater, 1.2 mm or greater, 1.4 mm or greater, 1.6 mm or greater, 1.8 mm or greater, 2.0 mm or greater, 2.2 mm or greater, 2.4 mm or greater, 2.6 mm or greater, 2.8 mm or greater, 3.0 mm or greater, 3.0 mm or greater, 3.2 mm or greater, or 3.4 mm or greater than a distance that the laser light travels into the liquid medium; and 5 mm or less than a distance that the laser light travels into the liquid medium.

In a twenty-seventh embodiment, the present disclosure provides a method according to any of the first to twenty-sixth embodiments, wherein the at least partially polymerized article exhibits a surface roughness of 1.0 micrometer $R_a$ or less, 0.9 micrometers $R_a$ or less, 0.8 micrometers $R_a$ or less, 0.7 micrometers $R_a$ or less, 0.6 micrometers $R_a$ or less, 0.5 micrometers $R_a$ or less, 0.4 micrometers $R_a$ or less, 0.3 micrometers $R_a$ or less, or 0.2 micrometers $R_a$ or less; and 0.1 micrometer $R_a$ or more.

In a twenty-eighth embodiment, the present disclosure provides a method according to any of the first to twenty-seventh embodiments, wherein the secondary component comprises a filler comprising ceramic particles, ceramic fibers, or a combination thereof, and the method further comprises d) burning out polymerized material and e) sintering the article to form a ceramic article.

In a twenty-ninth embodiment, the present disclosure provides a method according to the twenty-eighth embodiment, wherein the ceramic article is an orthodontic article or dental restoration.

In a thirtieth embodiment, the present disclosure provides an article. The article comprises a material defining one or more tortuous or arcuate channels, one or more internal architectural voids, one or more undercuts, one or more perforations, or combinations thereof, at least one of which exhibits a surface roughness of 1.0 micrometer $R_a$ or less.

In a thirty-first embodiment, the present disclosure provides an article according to the thirtieth embodiment, comprising a ceramic material and exhibiting a density of 95% or greater with respect to a theoretical density of the ceramic material, 96% or greater, 97% or greater, or 98% or greater with respect to a theoretical density of the ceramic material.

In a thirty-second embodiment, the present disclosure provides an article according to the thirtieth embodiment, wherein the material comprises amorphous, semicrystalline, or crystalline materials selected from metal, ceramic, polymer, carbon, organic semiconductors, inorganic semiconductors, or a combination thereof.

In a thirty-third embodiment, the present disclosure provides an article according to the thirty-second embodiment, wherein the material comprises a metal.

In a thirty-fourth embodiment, the present disclosure provides an article according to the thirty-second embodiment or the thirty-third embodiment, wherein the material comprises a ceramic.

In a thirty-fifth embodiment, the present disclosure provides an article according to any of the thirty-second to thirty-fourth embodiments, wherein the material comprises zirconia.

In a thirty-sixth embodiment, the present disclosure provides an article according to any of the thirty-second to thirty-fifth embodiments, wherein the material comprises alumina.

In a thirty-seventh embodiment, the present disclosure provides an article according to any of the thirty-second to thirty-sixth embodiments, wherein the material comprises silica.

In a thirty-eighth embodiment, the present disclosure provides an article according to any of the thirty-second to thirty-seventh embodiments, wherein the material comprises a polymer.

In a thirty-ninth embodiment, the present disclosure provides an article according to any of the thirty-second to thirty-eighth embodiments, wherein the material comprises a fluoropolymer.

In a fortieth embodiment, the present disclosure provides an article according to any of the thirty-second to thirty-ninth embodiments, wherein the material comprises carbon.

In a forty-first embodiment, the present disclosure provides an article according to any of the thirty-second to fortieth embodiments, wherein the material comprises an organic semiconductor.

In a forty-second embodiment, the present disclosure provides an article according to any of the thirty-second to forty-first embodiments, wherein the material comprises an inorganic semiconductor.

In a forty-third embodiment, the present disclosure provides an article according to any of the thirty-second to forty-second embodiments, wherein the filler comprises ceramic fibers.

In a forty-fourth embodiment, the present disclosure provides another method. The method comprises a) retrieving, from a non-transitory machine readable medium, data representing a 3D model of an article; b) executing, by one or more processors, a 3D printing application interfacing with a manufacturing device using the data; and c) generating, by the manufacturing device, a physical object of the article. The article comprises a gelled article obtained by at least partial polymerization of a liquid medium that is at least one of scattering or absorbing, the liquid medium comprising a polymerizable compound, a secondary component, and a multiphoton absorber.

In a forty-fifth embodiment, the present disclosure provides a further method. The method comprises a) receiving, by a manufacturing device having one or more processors, a digital object comprising data specifying a plurality of layers of an article; and b) generating, with the manufacturing device by an additive manufacturing process, the article based on the digital object. The article comprises a gelled article obtained by at least partial polymerization of a liquid medium that is at least one of scattering or absorbing, the liquid medium comprising a polymerizable compound, a secondary component, and a multiphoton absorber.

In a forty-sixth embodiment, the present disclosure provides a system. The system comprises a) a display that displays a 3D model of an article; and b) one or more processors that, in response to the 3D model selected by a user, cause a 3D printer to create a physical object of an article. The article comprises a gelled article obtained by at least partial polymerization of a liquid medium that is at least one of scattering or absorbing, the liquid medium comprising a polymerizable compound, a secondary component, and a multiphoton absorber.

In a forty-seventh embodiment, the present disclosure provides a non-transitory machine readable medium. The non-transitory machine readable medium comprises data representing a three-dimensional model of an article, when accessed by one or more processors interfacing with a 3D printer, causes the 3D printer to create an article. The article comprises a gelled article obtained by at least partial polymerization of a liquid medium that is at least one of scattering or absorbing, the liquid medium comprising a polymerizable compound, a secondary component, and a multiphoton absorber.

In a forty-eighth embodiment, the present disclosure provides an article made by the method of any of the first to twenty-ninth embodiments.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight.

A section of a 4 inch (10.16 cm) diameter silicon wafer (purchased from WRS Materials, LLC., San Jose, CA) was overlaid with a square cut section of sandblast stencil material (from 3M Company, St, Paul, MN) to create an interior reservoir, in which was poured a printing sol (i.e., a liquid medium for multiphoton imaging) prepared as described below.

Materials

| Material or abbreviation | Description |
| --- | --- |
| Sol-1a | Sol-1a, a zirconia-based sol prepared as described for Sol-S3 in U.S. patent application publication No. U.S. 2018/0127317 (Examples Section - Processing) |
| Diethylene glycol monoethyl ether | Diethylene glycol monoethyl ether obtained from Alfa Aesar (Ward Hill, MA, USA). |
| MEEAA | 2-[2-(2-Methoxyethoxy)ethoxy]acetic acid obtained from Sigma-Aldrich (St. Louis, MO, USA). |
| Acrylic acid | Acrylic acid obtained from Alfa Aesar. |
| HEA | Hydroxyethyl acrylate obtained from Alfa Aesar. |
| Octyl acrylate | Octyl acrylate, prepared as described in Example 4 of U.S. Pat. No. 9,908,837 (Colby et al.). |
| "SR351 H" | Trimethylolpropane triacrylate obtained from Sartomer USA (Exton, PA, USA) under the trade designation "SR351 H". |
| "CN975" | Hexafunctional urethane acrylate obtained from Sartomer USA under the trade designation "CN975". |

Printing Sol Preparation

Sol-1a had a composition of $ZrO_2$ (97.7 mole %)/$Y_2O_3$ (2.3 mole %) in terms of inorganic oxides and was prepared as described for Sol-S3 in U.S. Patent Application Publication No. US 2018/0127317 (Mayr et al., Examples Section—Processing).

A diethylene glycol monoethyl ether-based sol, Sol-1b, was produced by adding 2-[2-(2-methoxyethoxy)ethoxy] acetic acid (MEEAA) (3.56 weight % with respect to the grams of oxide in the sol) and the appropriate amount of diethylene glycol monoethyl ether (adjusted to the intended final oxide concentration in the sol, e.g., 60 weight %) to a portion of Sol-1a, and concentrating the sol via rotary evaporation. The resulting sol was 61.50 weight % oxide and 8.11 weight % acetic acid.

To prepare a printing sol CR1, a portion of Sol-1b (201.43 grams) was charged to a 250-mL bottle and combined with diethylene glycol monoethyl ether (60.19 grams), acrylic acid (13.39 grams), hydroxyethyl acrylate (HEA) (2.54 grams), octyl acrylate (1.27 grams), trimethylolpropane triacrylate ("SR351 H") (22.38 grams), and a hexafunctional urethane acrylate ("CN975") (11.17 grams). Prior to printing, 0.2 wt. % 2,5-bis[4-(diphenylamino)stryl]-1-(2-ethylhexyloxy)-4-methoxybenzene (KL68) photosensitizer (synthesized as described in U.S. Pat. No. 7,265,161 (Leatherdale et al.)); and 0.2 wt. % of PC-2506 diaryliodonium hexafluoroantimonate (from Polyset Co., Mechanicville, NY) were dissolved in the sol. The printing sol was then passed through a 1-micrometer filter.

An Olympus 10×/0.30 water immersion objective (available from Olympus Corp., Center valley, Pa.) was affixed with a protective barrel as described in the detailed description above and as shown in FIGS. 1A and 1B. The protective barrel in question, shown in FIG. 2C, was assembled from lens tube components SM1A1, SM1L05, SM1T10 (from Thorlabs Inc., Newton, NJ) and a cap machined from aluminum with a 1 mm thick window of fused silica that was attached using an epoxy. The component SM1A1 was modified with a drill press to remove the smaller set of threads and to accommodate the threaded portion of the Olympus objective.

The collar was anchored securely between the objective and the system objective mover to restrict motion and to keep the window parallel to the objective outlet. The base of the protective collar that includes the fused silica window was filled with 3M FLUORINERT ELECTRONIC LIQUID FC70 (3M Company, St. Paul, MN) for use as an index matching fluid. The objective-collar assembly was submerged in the liquid medium (i.e., the sol CR1). The objective was lowered to a point where the curing focal point of the beam was 300 microns (μm) below the surface of the silicon wafer. The threaded portion of the collar was extended until the silica window made light contact with the silicon and the upper locking nut was tightened to secure the threaded portion in place.

The zirconia-containing sol CR1 was cured through the assembly described above using a galvo based laser scanning system, wherein the laser source used was a MAI TAI DEEPSEE Ti:Sapphire (ultrafast laser (800 nanometer wavelength, <100 femtosecond pulse length, 80 megahertz repetition rate, available from Spectra-Physics, Santa Clara, CA). The power used was 50 mW, with a scan rate of 100 mm/s.

Example 1

The galvo scanning system was used to create a post with a square cross section having a size of 1 millimeter×1 millimeter in the XY dimension and 2.5 millimeters in a Z dimension in the CR1 sol. The cured post was rinsed using diethylene glycol monoethyl ether solvent to remove excess uncured material and to remove the cured post from the silicon wafer. The post was dried overnight in a covered glass petri dish. The dried gel body was placed on a bed of zirconia beads in an alumina crucible. The crucible was covered with alumina plates and then fired in air according to the following schedule:
 1—Heat from 20° C. to 220° C. at 18° C./hour rate,
 2—Heat from 220° C. to 244° C. at 1° C./hour rate,
 3—Heat from 244° C. to 400° C. at 6° C./hour rate,
 4—Heat from 400° C. to 1020° C. at 60° C./hour rate,
 5—Cool from 1020° C. to 20° C. at 120° C./hour rate.

The pre-sintered body was placed on a bed of zirconia beams in an alumina crucible. The crucible was covered with alumina plates, and the sample was sintered in air according to the following schedule:
 1—Heat from 20° C. to 1020° C. at 500° C./hour rate,
 2—Heat from 1020° C. to 1320° C. at 120° C./hour rate,
 3—Hold at 1320° C. for 2 hours,
 4—Cool down from 1320° C. to 20° C. at 500° C./hour rate.

The surface of the fully sintered post was measured using a Keyence VK-X200 laser scanning microscope with the 50× optical objective. The surface roughness of a face perpendicular to the silicon wafer during fabrication was measured in 6 locations with an average Ra surface roughness found to be 0.2684 micrometers with a standard deviation of 0.2026 micrometers.

Comparative Example 1

The same experiment described in example 1 was attempted without the use of the protective barrel. The Olympus objective was directly submerged in the zirconia-containing sol CR1. A series of attempts was made to cure the square post at varying locations in the z dimension to ensure at least one instance would appear intersecting the surface of the silicon. In practice, no solidly cured gel body could be formed via multiphoton imaging without the use of the protective collar element.

Example 2

Figure 11:
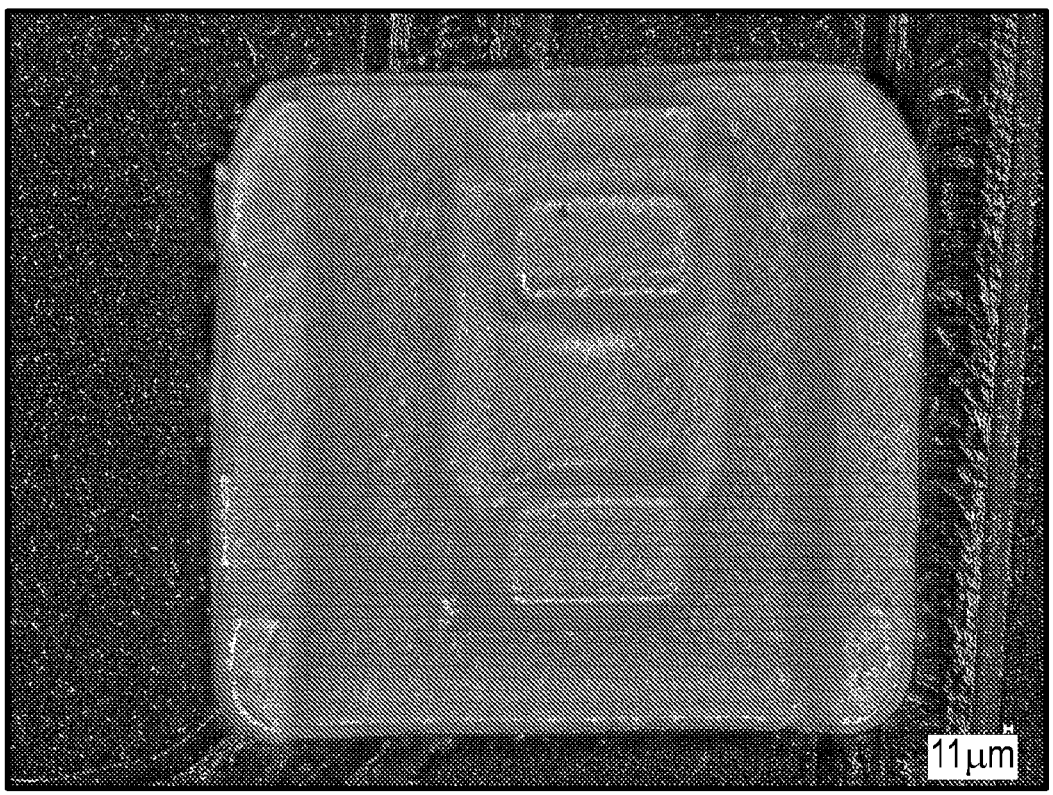
FIG. 11 is a photograph of a bracket according to Example 2.

Using the same method described in Example 1, the galvo steering system was used to fabricate a portion of an orthodontic bracket using multiphoton imaging (i.e., a door of a self-ligating orthodontic bracket). The outer dimensions of the bracket portion as cured were 2500 micrometers in the x direction, 1450 micrometers in the y direction, and 1900 micrometers in the z direction. The method was repeated to fabricate a second bracket door having the same dimensions. The bracket doors were post-processed in the same manner described in Example 1. A final sintered zirconia orthodontic bracket door is shown in FIG. 11. The surface roughness of several faces on the structured side of the sintered article was measured using a Keyence VK-X200 laser scanning microscope with the 50× optical objective. Six measurements were taken from the two separate bracket doors with an average Ra surface roughness found to be 0.6541 micrometers with a standard deviation of 0.3135 micrometers on the wire slot in the center of the bracket doors and an average of 0.5054 micrometers and a standard deviation of 0.2000 micrometers on the channels on the outside edges of the bracket doors.

All cited references, patents, or patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. A multiphoton imaging method comprising:
a) immersing a semi-submersible microscope objective in a liquid medium that is at least one of scattering or absorbing, the liquid medium comprising a polymerizable compound, a multiphoton absorber, and a secondary component comprising a filler comprising one or both of a plurality of particles or fibers, wherein the semi-submersible microscope objective comprises:
   i) a microscope objective having a protective barrel with an optical inlet and optical outlet; and
   ii) a protective element affixed to the microscope objective, sealing the optical outlet but not the optical inlet, wherein a transparent portion of the protective element is aligned with the optical outlet;
b) directing laser light through the semi-submersible microscope objective and into the liquid medium in an image-wise manner under conditions such that multiphoton absorption by the multiphoton absorber occurs, and at least partial polymerization of the polymerizable compound occurs resulting in an article; and
c) removing uncured polymerizable compound to clean the article.

2. The method of claim 1, wherein a distance between the transparent portion of the protective element and the optical outlet of the microscope objective is adjustable.

3. The method of claim 1, wherein the filler comprises amorphous, semicrystalline, or crystalline particles selected from metal, ceramic, polymer, carbon, organic semiconductors, inorganic semiconductors, or a combination thereof.

4. The method of claim 1, wherein the filler is dispersed in the liquid medium.

5. The method of claim 1, wherein the filler comprises ceramic particles.

6. The method of claim 1, wherein the liquid medium exhibits a minimum mismatch of refractive index between the polymerizable compound and the secondary component of 0.02 or greater, 0.03 or greater, 0.04 or greater, 0.05 or greater, 0.06 or greater, 0.07 or greater, 0.08 or greater, 0.09 or greater, 0.1 or greater, 0.12 or greater, 0.14 or greater, 0.15 or greater, 0.16 or greater, 0.18 or greater, 0.2 or greater, 0.25 or greater, 0.3 or greater, 0.35 or greater, 0.4 or greater, 0.45 or greater, 0.5 or greater, 0.55 or greater, 0.6 or greater, 0.65 or greater, 0.7 or greater, or 0.75 or greater.

7. The method of claim 1, wherein the liquid medium further comprises a secondary absorbing, stabilizing, or inhibiting material.

8. The method of claim 1, wherein the laser light travels into the liquid medium a distance of 10 micrometers or greater, 20 micrometers or greater, 30 micrometers or greater, 40 micrometers or greater, 50 micrometers or greater, 60 micrometers or greater, 70 micrometers or greater, 80 micrometers or greater, 90 micrometers or greater, or 100 micrometers or greater; and the laser light travels into the liquid medium a distance of 1 millimeter or less, 900 micrometers or less, 800 micrometers or less, 700 micrometers or less, 600 micrometers or less, 500 micrometers or less, 400 micrometers or less, 300 micrometers or less, 200 micrometers or less, or 150 micrometers or less.

9. The method of claim 1, wherein a field of view of the microscope objective is 100 micrometers or greater, 200 micrometers or greater, 300 micrometers or greater, 400 micrometers or greater, 500 micrometers or greater, 600 micrometers or greater, 700 micrometers or greater, 800 micrometers or greater, 900 micrometers or greater; and the field of view of the microscope objective is 10 millimeters (mm) or less, 8 mm or less, 6 mm or less, 4 mm or less, 3 mm or less, 2.5 mm or less, 2 mm or less, 1.5 mm or less, or 1 mm or less.

10. The method of claim 1, wherein the laser light has a focal length of 200 micrometers greater than a distance that the laser light travels into the liquid medium, 300 micrometers or greater, 400 micrometers or greater, 500 micrometers or greater, 600 micrometers or greater, 700 micrometers or greater, 800 micrometers or greater, 900 micrometers or greater, 1.0 mm or greater, 1.2 mm or greater, 1.4 mm or greater, 1.6 mm or greater, 1.8 mm or greater, 2.0 mm or greater, 2.2 mm or greater, 2.4 mm or greater, 2.6 mm or greater, 2.8 mm or greater, 3.0 mm or greater, 3.0 mm or greater, 3.2 mm or greater, or 3.4 mm or greater than a distance that the laser light travels into the liquid medium; and 5 mm or less than a distance that the laser light travels into the liquid medium.

11. The method of claim 1, further comprising:
d) burning out polymerized material; and
e) sintering the article to form a ceramic article.

12. The method of claim 11, wherein the ceramic article is an orthodontic article or dental restoration.

13. An article made by the method of claim 1.

* * * * *